United States Patent
Ozaki et al.

(10) Patent No.: US 7,467,263 B2
(45) Date of Patent: Dec. 16, 2008

(54) STORAGE SYSTEM, MANAGEMENT APPARATUS & METHOD FOR DETERMINING A PERFORMANCE PROBLEM USING PAST & CURRENT PERFORMANCE VALUES OF THE RESOURCES

(75) Inventors: Takeshi Ozaki, Yokohama (JP); Hideo Ohata, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 220 days.

(21) Appl. No.: 11/496,635

(22) Filed: Aug. 1, 2006

(65) Prior Publication Data
US 2007/0283107 A1 Dec. 6, 2007

(30) Foreign Application Priority Data
Jun. 6, 2006 (JP) ............................. 2006-156982

(51) Int. Cl.
G06F 12/00 (2006.01)
G06F 3/00 (2006.01)

(52) U.S. Cl. .................. 711/154; 709/217; 709/218; 709/219; 709/224; 709/226; 709/232; 709/233; 709/235; 710/15; 710/17; 710/18; 710/36; 710/38; 710/58; 710/60

(58) Field of Classification Search ................. 711/154; 709/217, 218, 219, 224, 226, 232, 233, 234, 709/235; 710/15, 17, 18, 36, 38, 58, 60; 707/10

See application file for complete search history.

(56) References Cited

U.S. PATENT DOCUMENTS

| | | | |
|---|---|---|---|
| 6,505,248 B1 | 1/2003 | Casper et al. | |
| 6,609,083 B2 * | 8/2003 | Enck et al. | 702/186 |
| 6,975,963 B2 * | 12/2005 | Hamilton et al. | 702/182 |
| 7,089,347 B2 * | 8/2006 | Mogi et al. | 711/100 |
| 7,107,273 B2 * | 9/2006 | Ohata et al. | 707/10 |
| 7,143,008 B2 * | 11/2006 | Ochi et al. | 702/186 |
| 7,277,821 B2 * | 10/2007 | Ochi et al. | 702/182 |
| 2001/0054093 A1 * | 12/2001 | Iwatani | 709/223 |
| 2003/0225830 A1 * | 12/2003 | Kataoka et al. | 709/203 |
| 2004/0024870 A1 * | 2/2004 | Hirata et al. | 709/224 |
| 2004/0102925 A1 * | 5/2004 | Giffords | 702/182 |
| 2004/0127999 A1 * | 7/2004 | Murase et al. | 700/19 |
| 2005/0086554 A1 * | 4/2005 | Simes | 714/4 |

* cited by examiner

*Primary Examiner*—Jack A Lane
(74) *Attorney, Agent, or Firm*—Reed Smith LLP; Stanley P. Fisher, Esq.; Juan Carlos A. Marquez, Esq.

(57) ABSTRACT

A highly-reliable system, a management apparatus and method that can enhance the reliability of a storage system is provided.

The present invention provides a storage system having a higher level system with a predetermined application installed, a storage apparatus providing a storage area the application uses, and a host server that transmits data between the higher level system and the storage apparatus, and a management apparatus and method for managing the storage system, wherein a current performance value for each of one or more performance information collection targets existing on a data path between the host server and the storage apparatus is collected; whether or not a performance problem has occurred is judged, based on a target performance value set in advance for the application and a current performance value for the application; and a threshold value for the performance value of each performance problem collection target is set, based on the current performance value of each performance information collection target and the result of the judgment of whether or not a performance problem has occurred.

16 Claims, 17 Drawing Sheets

FIG.4

| PATH ID | APPLICATION ID |
|---|---|
| A-1 | BUSINESS APPLICATION A |
| A-2 | BUSINESS APPLICATION A |
| B-1 | BUSINESS APPLICATION B |
| ⋮ | ⋮ |

| APPLICATION | UNIT OF PERFORMANCE | TARGET VALUE | PERFORMANCE VALUE |
|---|---|---|---|
| BUSINESS APPLICATION A | Response Time[s] | 3 | 2.8 |
| BUSINESS APPLICATION B | Response Time[s] | 3 | 1 |
| ⋮ | ⋮ | ⋮ | ⋮ |

| PATH ID | RESOURCE | UNIT OF PERFORMANCE | PERFORMANCE VALUE |
|---|---|---|---|
| A-1 | TABLE AREA A | HIT PERCENTAGE [%] | 80 |
| A-1 | VOLUME A | RESPONSE TIME [s] | 0.15 |
| A-1 | PORT A | Transfer [MB/s] | 88 |
| A-1 | PORT I | Transfer [MB/s] | 60 |
| A-1 | CACHE A | Usage [MB] | 1000 |
| A-1 | LOGICAL VOLUME A | Transfer [MB/s] | 65 |
| ⋮ | ⋮ | ⋮ | ⋮ |

| PATH ID | RESOURCE | PERFORMANCE UNIT | THRESHOLD VALUE FOR 'PERFORMANCE PROBLEM TIME' | RECORD ID |
|---|---|---|---|---|
| A-1 | TABLE AREA A | HIT PERCENTAGE [%] | 95 | 001 |
| A-1 | VOLUME A | RESPONSE TIME [s] | 0.4 | 001 |
| A-1 | PORT A | Transfer [MB/s] | 80 | 001 |
| A-1 | PORT I | Transfer [MB/s] | 90 | 001 |
| A-1 | CACHE A | Usage [MB] | 950 | 001 |
| A-1 | LOGICAL VOLUME A | Transfer [MB/s] | 75 | 001 |
| A-1 | TABLE AREA A | HIT PERCENTAGE [%] | 65 | 002 |
| A-1 | VOLUME A | RESPONSE TIME [s] | 0.33 | 002 |
| A-1 | PORT A | Transfer [MB/s] | 110 | 002 |
| A-1 | PORT I | Transfer [MB/s] | 80 | 002 |
| A-1 | CACHE A | Usage [MB] | 700 | 002 |
| A-1 | LOGICAL VOLUME A | Transfer [MB/s] | 60 | 002 |
| ⋮ | ⋮ | ⋮ | ⋮ | ⋮ |

| PATH ID | RESOURCE | CURRENT PERFORMANCE VALUE ACQUIRED BY POLLING | THRESHOLD VALUE FOR 'NO PERFORMANCE PROBLEM TIME' | RECORD ID |
|---|---|---|---|---|
| A-1 | TABLE AREA A | HIT PERCENTAGE [%] | 80 | 001 |
| A-1 | VOLUME A | RESPONSE TIME [s] | 0.2 | 001 |
| A-1 | PORT A | Transfer [MB/s] | 70 | 001 |
| A-1 | PORT I | Transfer [MB/s] | 60 | 001 |
| A-1 | CACHE A | Usage [MB] | 700 | 001 |
| A-1 | LOGICAL VOLUME A | Transfer [MB/s] | 80 | 001 |
| A-1 | TABLE AREA A | HIT PERCENTAGE [%] | 65 | 002 |
| A-1 | VOLUME A | RESPONSE TIME [s] | 0.18 | 002 |
| A-1 | PORT A | Transfer [MB/s] | 90 | 002 |
| A-1 | PORT I | Transfer [MB/s] | 55 | 002 |
| A-1 | CACHE A | Usage [MB] | 650 | 002 |
| A-1 | LOGICAL VOLUME A | Transfer [MB/s] | 90 | 002 |
| A-1 | TABLE AREA A | HIT PERCENTAGE [%] | 75 | 003 |
| A-1 | VOLUME A | RESPONSE TIME [s] | 0.23 | 003 |
| A-1 | PORT A | Transfer [MB/s] | 90 | 003 |
| A-1 | PORT I | Transfer [MB/s] | 30 | 003 |
| A-1 | CACHE A | Usage [MB] | 900 | 003 |
| A-1 | LOGICAL VOLUME A | Transfer [MB/s] | 40 | 003 |
| ⋮ | ⋮ | ⋮ | ⋮ | ⋮ |
| 87A | 87B | 87C | 87D | 87E |

| TITLE:ALERT:PERFORMANCE DETERIORATION PREVENTION WARNING (APPLICATION A) | ~91 |

| SENDER:alerter@***.co.jp | ~92 |

PERFORMANCE DETERIORATION PREVENTION WARNING HAS BEEN ISSUED.

TARGET PERFORMANCE VALUE SET FOR APPLICATION A MAY NOT BE SATISFIED.

〔Application A〕

TARGET PERFORMANCE VALUE:     5.0[s]
ACQUIRED PERFORMANCE VALUE:  4.3[s]
TIME OF ACQUISITION:                       2006/01/30  18:00:00

| FILE A | VOLUME A |
|---|---|
| FILE B | VOLUME A |
| FILE C | VOLUME A |
| FILE D | VOLUME B |
| FILE E | VOLUME B |
| FILE F | VOLUME C |
| FILE G | VOLUME C |

| VOLUME A | LOGICAL VOLUME A | PORT A | PORT N |
|---|---|---|---|
| VOLUME B | LOGICAL VOLUME B | PORT A | PORT N |
| VOLUME C | LOGICAL VOLUME C | PORT A | PORT O |

| FILE H | VOLUME D |
|---|---|
| FILE I | VOLUME D |
| FILE J | VOLUME D |

| VOLUME D | LOGICAL VOLUME D | PORT B | PORT P |
|---|---|---|---|

| TABLE D | TABLE AREA D |
|---|---|
| TABLE E | TABLE AREA D |
| INDEX C | TABLE AREA D |

| TABLE AREA D | FILE H |
|---|---|
| TABLE AREA D | FILE I |
| TABLE AREA D | FILE J |

| PORT A | PORT N | {PORT C, PORT D, PORT H, PORT I} |
|--------|--------|----------------------------------|
| PORT A | PORT O | {PORT C, PORT E, PORT J, PORT L} |
| PORT B | PORT P | {PORT F, PORT G, PORT K, PORT M} |

| LOGICAL VOLUME A | PARITY GROUP A |
|------------------|----------------|
| LOGICAL VOLUME B | PARITY GROUP A |
| LOGICAL VOLUME C | PARITY GROUP B |
| LOGICAL VOLUME D | PARITY GROUP B |

107A    107B    107

STORAGE SYSTEM, MANAGEMENT APPARATUS & METHOD FOR DETERMINING A PERFORMANCE PROBLEM USING PAST & CURRENT PERFORMANCE VALUES OF THE RESOURCES

CROSS-REFERENCES TO RELATED APPLICATIONS

This application relates to and claims priority from Japanese Patent Application No. 2006-156982, filed on Jun. 6, 2006, the entire disclosure of which is incorporated herein by reference.

BACKGROUND

1. Field of the Invention

The invention relates to a storage system, and a management apparatus and method, for example, those that are suitable for use in a storage system in which plural host servers access a storage apparatus via a network.

2. Description of Related Art

Storage systems having configurations in which plural host servers access an integrated storage apparatus via a network are becoming widespread as data center architectures to enhance the utilization efficiency of storage apparatuses, which have been growling in scale, and reduce management costs.

In order to monitor the performance of, or to tune, the business operation systems in such a storage network environment, it is necessary to collect information on all the various kinds of hardware apparatuses and software that constitute the storage system, and grasp their mutual relationships and temporal changes.

This is because in a storage network environment, performance interference may occur between business operation systems at a shared part, such as a network device, or a storage apparatus, etc., which does not happen in architecture in which a host server and a storage apparatus are directly connected to each other and in which each business operation system is independently provided for each server.

In order to meet the above need, in conventional storage systems, agents are arranged in a storage system in association with respective performance monitoring target hardware apparatuses and software, and management software that collectively manages the performance status of the entire storage system is provided.

The agents each directly communicate with their respective monitoring targets and acquire, as performance information, performance values for the resources (performance information collection targets) in the performance monitoring targets. Here, a resource refers to a storage system component for which a certain metric value (performance value) can be obtained. Examples of resources include a port for a SAN switch included in a SAN, and cache memory or a logical volume in a storage apparatus. A metric value indicates an individual performance parameter for a system component, that is a candidate for performance monitoring. Examples of a metric value include a transfer rate for a port for a SAN switch, memory utilization of cache memory in a storage apparatus, and a data input/output rate for a logical volume in a storage apparatus.

The management software collects and stores the performance information acquired by the agents, monitors the resources based on the stored performance information and the threshold values set by a system administrator in advance for the respective resources, and when a performance value for a resource exceeds the threshold value set for the resource, it notifies the system administrator.

Although it is an example of a computer network, rather than a storage network, U.S. Pat. No. 6,505,248 discloses a method and system for monitoring the performance of a plurality of server apparatuses in a network environment.

SUMMARY

In the aforementioned conventional storage systems, in order to achieve the performance required by each of the business operation systems, the system administrator sets an individual threshold value for each of the resources on the paths used by the business operation systems (data paths) based on their past experience, and trial and error.

However, ordinarily, plural resources exist on any one path, and the performance of the entire path is determined by these resources functioning in a mutually complementary manner. Accordingly, when a logical volume and cache memory exist on a path as resources, even if the logical volume exhibits a poor performance value, the target performance required by the business operation system may still be achieved in the entire path if there is capacity to spare in the cache memory's value.

Therefore, a highly-reliable storage system can be build if the threshold value for the performance value of each resource can be determined taking into account the mutually-complimentary dependence relationship in terms of performance between the resources existing on a path a business operation system uses.

The present invention has been made in view of the above points, and an object of the present invention is to provide a highly-reliable system, a management apparatus and method that can enhance the reliability of a storage system.

In order to achieve the above object, the present invention provides a storage system having a higher level system with a predetermined application installed, a storage apparatus providing a storage area the application uses, and a host server that transmits data between the higher level system and the storage apparatus; the storage system including: a performance information collection unit that collects a current performance value for each of one or more performance information collection targets existing on a data path between the higher level system and the storage apparatus; a performance judgment unit that judges whether or not a performance problem has occurred, based on a target performance value set in advance for the application and a current performance value for the application; and a threshold setting unit that sets a threshold value for the performance value of each performance information collection target, based on the current performance value of each performance information collection target collected by the performance information collection unit and the result of the performance judgment unit's judgment.

This storage system makes it possible to set the threshold value for each performance information collection target, comprehensively taking into account the mutually-complementary dependence relationship in terms of performance between the resources.

The present invention also provides a management apparatus having a higher level apparatus with a predetermined application installed, a storage apparatus providing a storage area the application uses, and a host server that transmits data between the higher level apparatus and the storage apparatus; the management apparatus including: a performance information collection unit that collects a current performance value for each of one or more performance information collection targets existing on a data path between the host server and the storage apparatus; a performance judgment unit that judges whether or not a performance problem has occurred, based on a target performance value set in advance for the application and a current performance value for the application; and a threshold value setting unit that sets a threshold value for the performance value of each performance information collection target based on the current performance value of each performance information collection target collected by the performance information collection unit and the result of the performance judgment unit's judgment.

This management apparatus makes it possible to set the threshold value for each performance information collection target, comprehensively taking into account the mutually-complementary dependence relationship in terms of performance between the resources.

The present invention further provides a management method for a storage system having a higher level system with a predetermined application installed, a storage apparatus providing a storage area the application uses, and a host server that transmits data between the higher level system and the storage apparatus; the method including: a first step of collecting a current performance value for one or more performance information collection targets existing on a data path between the host server and the storage apparatus; a second step of judging whether or not a performance problem has occurred, based on a target performance value set in advance for the application and a current performance value for the application; and a third step of setting a threshold value for the performance value of each performance problem collection target, based on the current performance value of each performance information collection target and the result of the judgment of whether or not a performance problem has occurred.

This management method makes it possible to set the threshold value for each performance information collection target, comprehensively taking into account the mutually-complementary dependence relationship in terms of performance between the resources.

The present invention makes it possible to obtain a highly-reliable storage system, and a management apparatus and method that can enhance the reliability of a storage system.

BRIEF DESCRIPTION OF THE DRAWINGS

FIG. 4 is a diagram showing an example of a path-application relationship table.

FIG. 5 is a diagram showing an example of an application performance value table.

FIG. 6 is a diagram showing an example of a 'polling time' record table.

FIG. 7 is a diagram showing an example of a 'performance problem time' record table.

FIG. 8 is a diagram showing an example of a 'no performance problem time' record table.

FIG. 9 is a diagram showing an example of a warning window.

FIG. 10A is a diagram showing an example of a file-volume relationship table; and FIG. 10B is a diagram showing a volume-logical volume-port relationship table.

FIG. 11A is a diagram showing an example of a file-volume relationship table; and FIG. 11B is a diagram showing a volume-logical volume-port relationship table.

FIG. 12A is a diagram showing an example of a database object file-table area relationship table; and FIG. 12B is a diagram showing the configuration of a table area-file relationship table.

FIG. 13 is a diagram showing an example of a port-to-port path table.

FIG. 14 is a diagram showing an example of a logical volume-parity group relationship table.

DETAILED DESCRIPTION OF PREFERRED EMBODIMENTS

An embodiment of the present invention is described below in detail with reference to the drawings.

Figure 1:
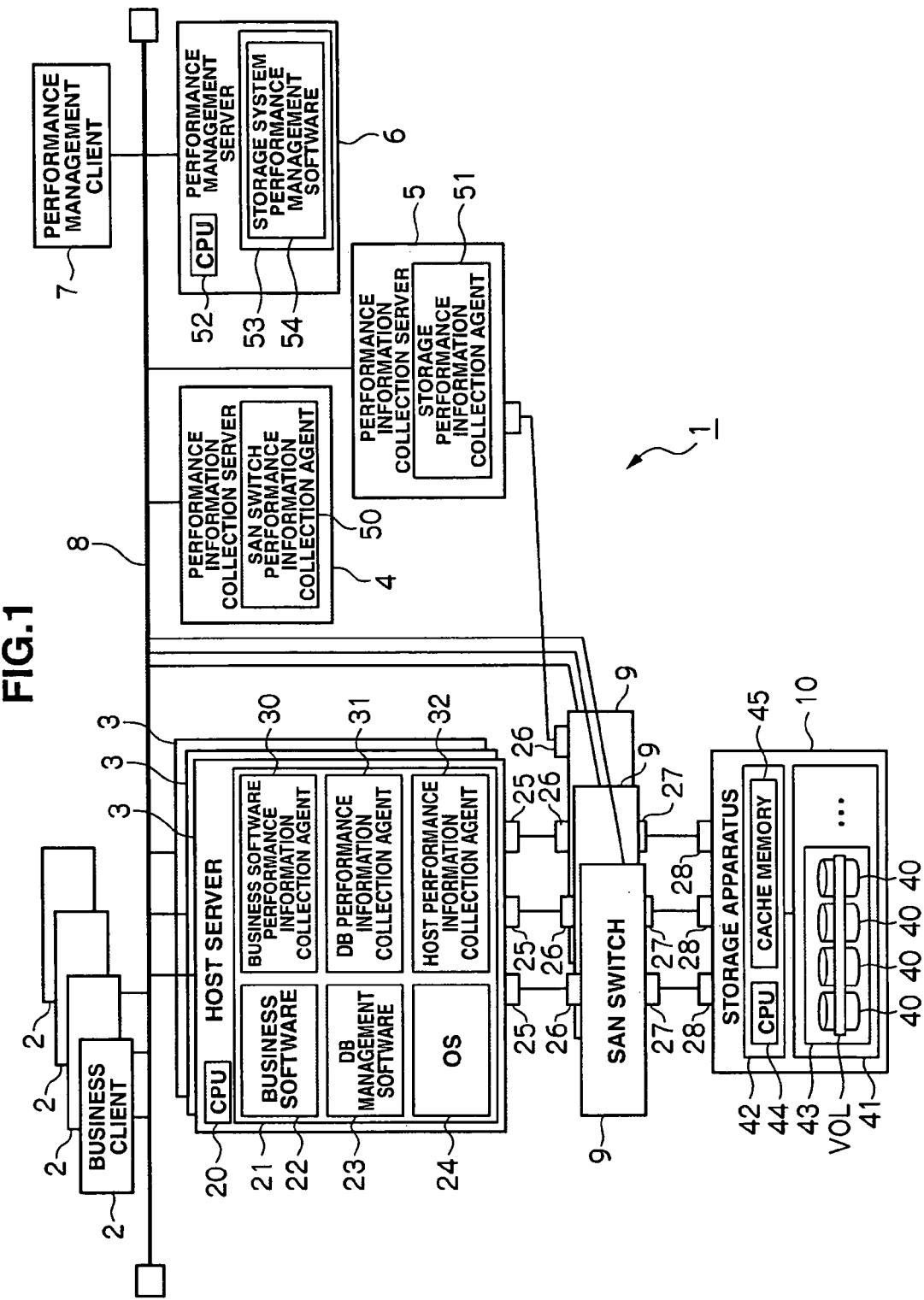
FIG. 1 is a block diagram showing the overall configuration of a storage system according to an embodiment of the present invention.

(1) Configuration of a Storage System According to an Embodiment of the Present Invention FIG. 1 shows a storage system according to an embodiment of the present invention. The storage system 1 has a plurality of business clients 2, a plurality of host servers 3, a plurality of performance information collection servers 4 and 5, a performance management server 6, and a performance management client 7 connected via a LAN (Local Area Network) 8, and also includes a storage apparatus 10 connected to the host servers 3 via a SAN consisting of a plurality of SAN switches 9.

A business client 2 is a computer apparatus with a predetermined business application, which provides a user interface function for a business operation system, installed, and includes information processing resources such as a CPU (Central Processing Unit), memory, etc., and a display device, such as a liquid-crystal display or a CRT (Cathode Ray Tube), etc. The business clients 2 may be personal computers, work stations, or thin client terminals, etc.

The host servers 3 are computer apparatuses that transmits data between the business clients 2 and the storage apparatus 10, and each include a CPU 20, and memory 21, etc. The CPU 20 executes various processing by executing various kinds of software stored in the memory 21. The memory 21 is used to hold the software, and also used as work memory for the CPU 20. The memory 21 stores, as software to constitute the business operation system, business software 22, database management software 23, and an OS (Operating System) 24.

The business software 22 is software that provides a logical business function for the business operation system, and makes requests to the database management software 23 to refer to or update data, in response to processing requests given from the business clients 2 via the LAN 8. The database management software 23 is software that provides a data management function for a business operation system, and performs the processing relating to definition, operation or management of data stored in the storage apparatus 10, in response to requests from the business software 22. The database management software 23 accesses data in the storage apparatus 10 via the OS 24, a port 25 for a host bus adapter, a host-side port 26 for a SAN switch 9, the SAN switch 9, a storage-side port 27 for the SAN switch 9, and a port 28 for the storage apparatus 10.

The memory 21 in each host server 3 stores a business software performance information collection agent 30, a database performance information collection agent 31 and a host performance information agent 32, as software constituting a performance management system for performance management of the storage system 11.

The business software performance information collection agent 30 and database performance information collection agent 31 are software for acquiring performance information, such as response times, about the business software 22 and database management software 23, and send the acquired performance information to the performance management server 6. The host performance information collection agent 32 is software for acquiring performance values (performance information) for its own host server 3, the OS 24, and the port 25 for the host bus adapter, and sends the acquired performance information to the performance management server 6.

The SAN switches 9 are network devices that connect the host servers 3 and the storage apparatus 10 in a manner in which the paths can freely be switched, and they have a plurality of host-side ports 26 and a plurality of storage-side ports 27. The host-side ports 26 for the SAN switch 9 are connected to the ports 25 for the host servers 3, and the storage-side ports 27 are connected to the ports 28 for the storage apparatus 10, connecting the host servers 3 and the storage apparatus 10. Consequently, communication via the SAN switches 9 is conducted between the host servers 3 and the storage apparatus 10.

The storage apparatus 10 includes a disk unit 41 consisting of a plurality of physical disks 40, and a control unit that controls the disk unit 41.

The physical disks 40 may be expensive disk drives, such as FC (Fibre Channel) disks, or inexpensive disk drives, such as FATA (Fibre Attached Technology Adapted) or SATA (Serial AT Attachment) disks or optical disk drives. A predetermined number of physical disks 40 (e.g., 4 disks) form one parity group 43, and one or more logical volumes VOL, which are logical storage areas, are defined over the physical storage areas provided by the parity group 43. The data used by a business application, which is sent from the host servers 3, is written/read to/from these logical volumes VOL in blocks of a predetermined size.

The control unit 42 includes a CPU 44, and cache memory 45, etc. The CPU 44 is a processor that controls the overall operation of the storage apparatus 10, and collects performance information relating to the cache memory 45, the logical volumes VOL and the parity group 43, etc., and sends the collected performance information to the performance management server 6. The cache memory 45 is used mainly for temporarily storing data input/output to/from the storage apparatus 10.

The performance information processing servers 4 and 5 are computer apparatuses, which may be personal computers or work stations, and each has a SAN switch performance information collection agent 50 or storage performance information collection agent 51 installed.

The SAN switch performance information collection agent 50 is software for collecting performance information relating to the SAN switches 9, and collects performance information on the SAN switches 9 and their ports 26 and 27 via the LAN 8, and sends the collected performance information to the performance management server 6. The storage performance information collection agent 51 is software for collecting performance information relating to the storage apparatus 10, and acquires performance information on the storage apparatus 10 and its ports 28 via the SAN switches 9, and sends the acquired performance information to the performance management server 6.

The performance management server 6 is a computer apparatus including a CPU 52 and memory 53, and may be a personal computer, work station, or main frame or the like. The CPU 52 executes various processing described later, by executing software stored in the memory 53. The memory 53 is used for holding various kinds of software, and is also used as work memory for the CPU 52. The memory 53 stores storage network performance management software 54.

The storage network performance management software 54 is software for performance management of the storage system 1, and sets a threshold performance value for each of the resources in the storage system 1 based on the performance information relating to the host servers 3, the SAN switches 9 and the storage apparatus 10 respectively collected by the business software performance information collection agent 30, the database performance information collection agent 31 and the host performance information collection agent 32 in the host servers 3, and the SAN switch performance information agent 50 and the storage performance information collection agent 51 in the performance information collection servers 4 and 5; and monitors the performance of the storage system 1 based on the set threshold values.

The performance management client 7 is a computer apparatus that provides a user interface function for the performance management server 6, and communicates with the performance management server 6 via the LAN 8. A typical example may be a configuration in which a general-purpose personal computer is used as the performance management client 7 and Web browser software operating on the personal computer is used as a specific user interface. In this case, the Web server software operates on a computer used as a performance management server, and the performance information collected by the storage network management software is sent to a Web browser via the Web server software according to HTTP protocol (Hyper Text Transfer Protocol) and displayed on a display.

(2) Performance Monitoring and Warning Function in the Storage System

Next, the performance monitoring and warning function in the storage system 1 will be explained below. First, the resources in the storage system 1 and the dependence relationships in terms of performance between the resources will be explained.

Figure 2:
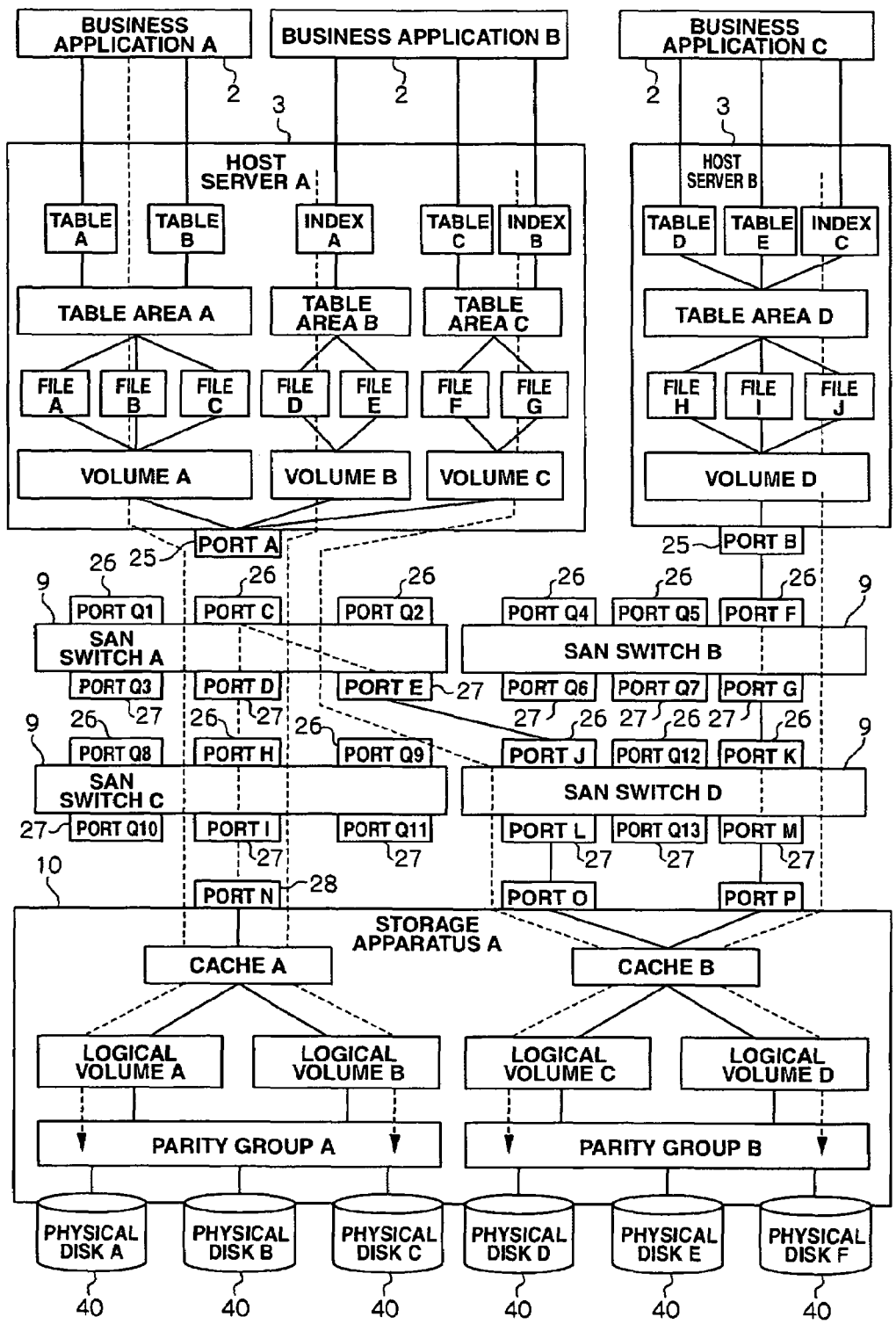
FIG. 2 is a conceptual diagram provided for explaining a specific example of resources and the dependence relationships in terms of performance between the resources.

FIG. 2 shows a specific example of the resources in the storage system 1 and the dependence relationships in terms of performance between resources. Various kinds of resources exist for the hardware apparatuses and software constituting the storage system 1. Resources existing on the same path are in a relationship in which they functionally affect each other.

As shown in FIG. 2, the storage system 1 consists of two host servers 3, denoted by host servers A and B, four SAN switches 9, denoted by SAN switches A to D, and one storage apparatus 10, denoted by storage apparatus A.

In host server A, the database performance information collection agent 31 and the host performance information collection agent 32 operate in order to acquire performance information on the database management software 23, host server A's hardware and the OS 24.

In this case, tables A to C, indexes A to C, and table areas A to C are managed by the database management software 23, and are examples of resources that are targets of the database performance information collection agent 31's acquisition of performance information.

Tables A to C themselves constitute data according to an expression format using relational database management software, and indexes A and B are data for speeding up searches of tables A to C. Examples of metrics of tables A to C include the number of inserted records, the number of read records. Table areas A to C are logical units that indicate areas for storing tables A to C and indexes A and B in the database management software 23, and examples of metrics for the table areas include a hit percentage, the number of I/Os per second, the number of reads per second, the number of writes per second, and the transfer rate.

In FIG. 2, a line connecting table A, table B and table area A shows that table A and table B are stored in table area A. Their relationship is also a dependence relationship in terms of performance, i.e., the load caused when the business software 22 refers to or updates table A and table B results in read or write from/to table area A.

Files A to G, volumes A to G, and port A are examples of resources that are targets of the host performance information collection agent 32's acquisition of performance information.

Files A to G are units for the OS 24 to provide input/output services, and the metrics of the files include the number of I/Os per second, the number of reads per second, the number of writes per second, the transfer rate, a read transfer rate and a write transfer rate. Volumes A to C are managed by the OS 24 as areas for storing files A to G in the storage apparatus 10, and examples of their metrics include the used amount, the number of I/Os per second, the number of reads per second, the number of writes per second, the transfer rate, a read transfer rate and a write transfer rate.

Like the dependence relationships between tables A to C and table areas A to C, files A to G are allocated as the destinations where table areas A to C are stored, and volumes A to C are allocated as the destinations where file A to file G are stored. Thus, there are dependence relationships in terms of performance between these resources. The FIG. 2 example shows that table area A is stored in file A to file C, and file A to file C is stored in volume A, and thus, there are dependence relationships in terms of performance between table area A and file A to file C, and between file A to file C and volume A.

At host server B, a database performance information collection agent 31, and a host performance information collection agent 32 operate. The resources that are targets of the host server B database performance information collection agent 31's acquisition of performance information are table D, table E, index C and table area D, and the resources that are targets of the host server B host performance information collection agent 32's acquisition of performance information are files H to J, and volume D and port B. Metrics for table D, table E, index C, table area D, files H to J, and volume D are the same as described above, and thus their explanation will be omitted. Examples of a metric for port B include a data transfer percentage.

The SAN switch performance information collection agent 50 operates to acquire performance information on SAN switches A to D. The resources that are targets of the SAN switch performance information collection agent 50's acquisition of performance information are port C to port E, and the other ports Q1 to Q3 for SAN switch A, port F, port G, and the other ports Q4 to Q7 for SAN switch B, port H, port I, and the other ports Q8 to Q11 for SAN switch C, port J to port M, and the other ports Q12 and Q13 for SAN switch D. Examples of metrics for port A to port M, and port Q1 to port Q13 include the data transfer rate, a read transfer rate, and a write transfer rate.

The storage performance information collection agent 51 operates to acquire performance information on storage apparatus A. The resources that are targets of the storage performance information collection agent 51's acquisition of performance information are ports N to P, logical volumes A to D, parity groups A and B, and the physical disks 40A to 40F. Metrics for port N to port P are the same as described above. Metrics for logical volume A, logical volume B, and parity group A include the data transfer rate, the number of I/Os per second, the number of reads per second, and the number of writes per second.

Volumes A to C in host server A and volume D in host server B are allocated to parity groups A and B. Parity groups A and B are allocated to physical disks A to C, and D to F, respectively. Therefore, there are dependence relationships in terms of performance between these resources. When pairs are set between volumes A to C in host server A and volume D in host server B, and logical volumes A to D in storage apparatus A to which volumes A to C and volume D are allocated, paths from either of ports A and B in the host bus adapters, through either of ports A to M for SAN switches A to D, to either of ports N to P in storage apparatus A will be determined as the paths for input/output data transmitted between each pair.

Accordingly, the loads for input/output imposed on volume A to volume D in host server A and host server B will be the loads for communication with port A to port P on the paths, and therefore, there are dependence relationships in terms of performance between the pairs of volumes A to D and logical volumes A to D, and ports A to P on the paths.

The FIG. 2 example shows that volume A is allocated to logical volume A, logical volume A to parity group A, and parity group A to physical disks 40, and a path from port A, through port C, port D, port H, and port I, to port N is set for the pair of volume A and logical volume A, and thus, there is a dependence relationship in terms of performance between these resources.

As explained above, in the storage system 1, since there are dependence relationships in terms of performance between the resources on the paths, a conventional system configuration would have a problem in that it would be difficult to set a highly-reliable threshold value, because a threshold value for the performance value of each resource (the metric value for a predetermined metric), set for the purpose of achieving the target performance required by a business application installed in the business clients 2 (target response time/throughput value), is individually set by trial and error.

Therefore, in the storage system 1 according to the present embodiment, in order to achieve the target performance required by a business application, the threshold value for the performance value of each resource existing on the paths between the host servers 3 and the storage apparatus 10 used by any of the business applications is set taking the dependence relationships in terms of performance between the resources (threshold value setting processing). Also, the storage system 1 according to the present embodiment constantly monitors the performance status of each path, and when the status of any of the paths begins to deteriorate, it sends a preliminary warning about the performance status of the path to a system administrator (preliminary warning processing).

As explained above, the storage system 1 according to the present embodiment sets a threshold value for the performance value of each resource on the paths, taking into account the dependence relationships in terms of performance between the resources for each path, making it possible to set the threshold value for the performance value of each resource in a highly-reliable manner, and also to send a highly-reliable warning to a system administrator.

Figure 3:
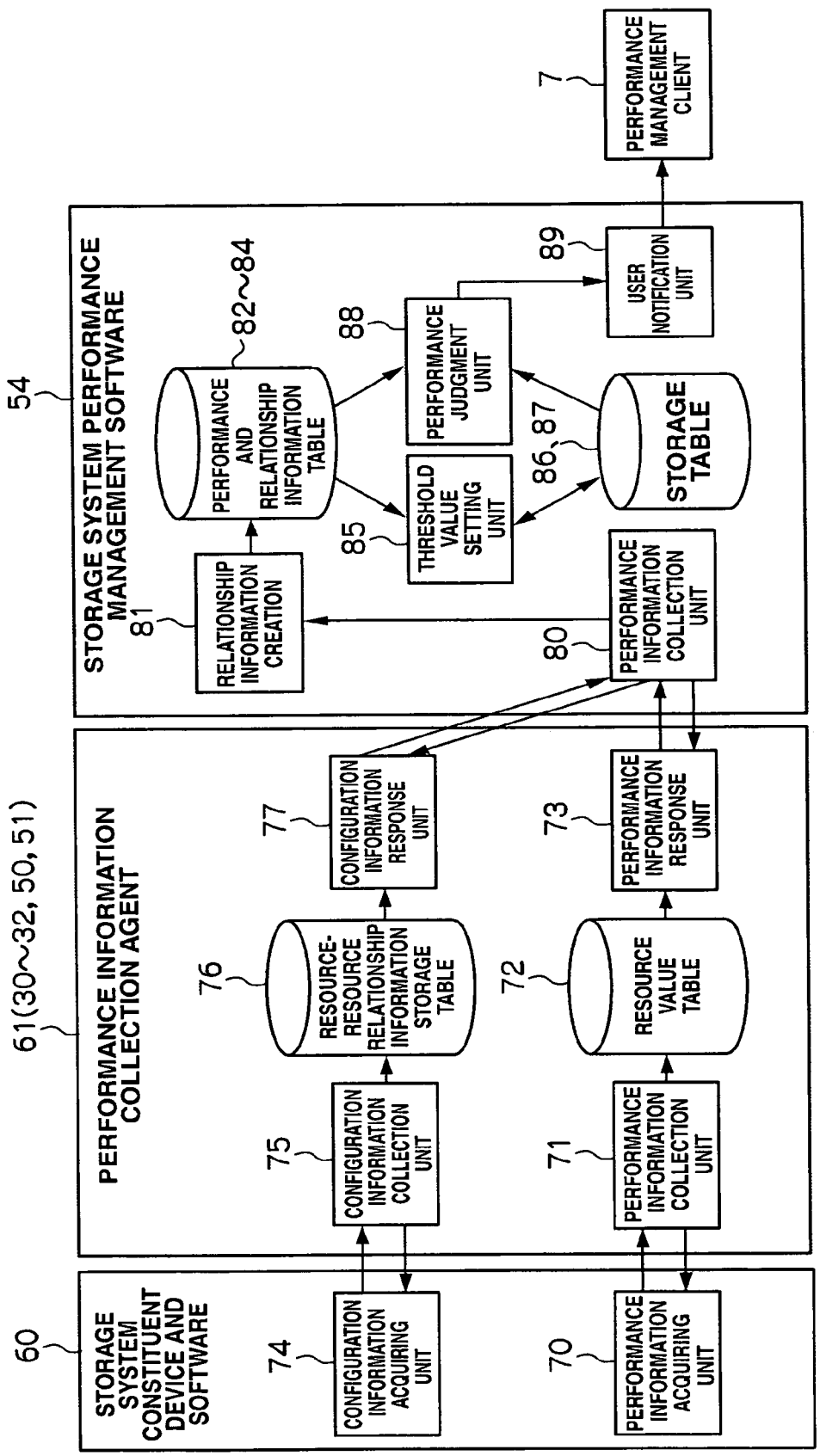
FIG. 3 is a block diagram provided for explaining the details of a performance information collection agent and storage system performance management software.

FIG. 3 shows a specific configuration for each of the performance information collection agent 61 and the storage system performance management software 54, which is mainly involved in the performance monitoring and warning function of the storage system 1. Each of the units in the performance information collection agent 61 and the storage system information management software 54 shown in FIG. 3 is a functional block that functions as a result of the CPU in the information collection server 4 or 5, or the CPU 52 in the performance management server 6 executing the relevant program.

In FIG. 3, the storage system constituent device and software 60 are hardware and software that are targets of performance monitoring in the storage system 1. The storage system constituent device and software shown in FIG. 3 can be any of the host servers 3, the port 25 for the host bus adapter, the business software 22, the database management software 23, the SAN switches 9 and their ports 26 and 27, and the storage apparatus 10 and its ports 28, etc.

Also, in FIG. 3, the performance information collection agent 61 corresponds to any of the business software performance information collection agent 30, the database performance information collection agent 31, the host performance information collection agent 32, the SAN switch performance information collection agent 50 and the storage performance information collection agent 51.

The performance information collection agent 61's collection of various kinds of performance information and the storage system performance management software 54's monitoring of the storage system 1's performance are conducted as follows.

A performance information collection unit 71 in the performance information collection agent 61 is periodically activated by a timer according to the scheduling settings each performance information collection agent 61 has, or by a request from the storage system performance management software 54. The performance information collection unit 71, after activation, confirms the collection status, such as the possibility or non-possibility of collection, frequency, and last collection time and date, for each performance parameter in the storage system constituent device and software 60 relevant to its own agent, based on information given from the storage system performance management software 54.

A metric, as described above, refers to an individual performance parameter for a system component, that is a candidate for performance monitoring. Examples of the metric include: CPU utilization; memory utilization; the number of I/Os to/from a storage apparatus; an I/O busy percentage, the transfer rate, and throughput for the storage apparatus; the buffer hit percentage, and the number of records inserted, updated or deleted for database management software; the time required for a Web server's response; free area, utilization, an amount of input/output data, the time of use of a file system or disk; the number of errors in a network interface; buffer overflow; and a frame error.

Based on the results of the confirmation, the performance information collection unit 71 makes a request to the performance information acquiring unit 70 in the system constituent device and software 60 that can measure the metrics to be collected, to send the measured values. The metric values returned from the performance information acquiring unit 70 in response to this request are stored by the performance information collection unit 71 in a metric value table 72.

Collection of resource-resource relationship information is conducted as follows, and is similar to the above-described performance information collection. The configuration information collection unit 75 in the performance information collection agent 61 is periodically activated according to scheduling settings, or by a request from the storage system performance management software 54. The configuration information collection unit 75, after activation, makes a request to the configuration information acquiring unit 74 in the storage system constituent device and software 60 relevant to its own agent to send resource-resource relationship information (polling), receives the requested information, and stores the received information in a resource-resource relationship information storage table 76. An iSNS (Internet Storage Name Server) may be used to acquire information from various devices. Also, an ESI (Entity Status Inquiry) may be used to acquire devices' status information, and storage system constituent device information may also be acquired using other methods.

Meanwhile, a performance information collection unit 80 in the storage system performance management software 54 is periodically activated according to scheduling settings. The performance information collection unit 80, after activation, makes a request to the performance information response units 73 in all the performance information collection agents 61 in the storage system 1 to send the metrics for necessary resources (polling). Each performance information response unit 73, upon receipt of this request, searches the metric value table for the requested resource metric values, and sends them to the performance information collection unit 80. Accordingly, the performance information collection unit 80, upon receipt of the metric values for the necessary resources from the performance information collection agent 61, sends them to a relationship information creation unit 81.

The performance information collection unit 80, after activation, makes a request to the configuration information response units 77 in all the performance information collection agents 61 in the storage system 1 to send resource-resource relationship information collected by each performance information collection agent 61. Each configuration information response unit 77, upon receipt of this request, reads the requested resource-resource relationship information from the resource-resource relationship information storage table 76, and sends it to the performance information collection unit 80. Then, the performance information collection unit 80, upon receipt of the resource-resource relationship information from the performance information collection agent 61, sends it to the relationship information creation unit 81.

The relationship information creation unit 81, upon receipt of the metric values of the resources and the resource-resource relationship information from the performance information collection unit 80, creates the path-application relationship table 82 shown in FIG. 4, the application performance value table 83 shown in FIG. 5, and the 'polling time' record table 84 shown in FIG. 6, based on these metrics for the resources and the resource-resource relationship information.

The path-application relationship table 82 is a table used to manage the path each business application uses, and as shown in FIG. 5, consists of a path ID column 82A and an application ID column 82B.

The path ID column 82A stores IDs (identifiers) for paths, and the application ID column 82B stores IDs for business applications that use the corresponding paths. Accordingly, the FIG. 5 example shows that the path with path ID "A-1" is used by a business application with application ID "business application A."

The application performance value table 83 is a table for managing the target performance value for each business application, and the current performance value for each business application, and as shown in FIG. 5, consists of an application ID column 83A, a performance unit column 83B, a target value column 83C, and a performance value column 83D.

The application ID column 83A stores IDs for the business applications (e.g., application names), and the performance unit column 83B stores the metric names that are the targets of performance evaluation of the corresponding business applications. The target value column 83C stores the target performance values set by a system administrator in advance for the corresponding business applications, and the performance value column 83D stores the current metric values of the metrics of the corresponding applications (i.e., the current performance values for the corresponding business applications) collected by the business software performance information collection agents 30 (FIG. 1).

Thus, the FIG. 5 example shows that the target value of the metric ("Response Time") set by a system administrator for the business application with application ID "business application A" is "3," and that the current performance value of that business application acquired by polling is "2.8."

As described later, in the storage system 1 according to the present embodiment, when the target performance value of a business application is smaller than the current performance value, a performance problem is judged as having occurred in the path the business application uses. Accordingly, in the FIG. 5 example, the path the business application with application ID "business application A" uses will be judged as having a performance problem.

The 'polling time' record table 84 is a table for managing the current performance values of the resources in units of paths, based on performance information relating to the host servers 3, the SAN switches 9 and the storage apparatus 10, collected by the storage system performance management software 54 in the performance management server 6 from the performance information collection agents 61 (FIG. 3), and as shown in FIG. 8, consists of a path ID column 84A, a resource column 84B, a performance unit column 84C, and a performance value column 84D.

The path ID column 84A stores path IDs for the relevant paths, and the resource column 84B stores the resource names of the resources existing on the paths. The performance unit column 84C stores the metric names of the metrics determined in advance as performance evaluation parameters for the corresponding resources, and also, the performance value column 84D stores the current metric values (the performance values of the corresponding resources) acquired for the metrics for the corresponding resources.

Accordingly, the FIG. 6 example shows that resources, such as "TABLE AREA A" "VOLUME A" "PORT A" "PORT I" "CACHE A" "LOGICAL VOLUME A", etc., exist on the path with path ID "A-1." At this time, the metric value of "HIT PERCENTAGE," which is the metric for "TABLE AREA A," acquired by polling is "80[%]," the metric value of "RESPONSE TIME," which is the metric for "VOLUME A," is "0.15 [s]," and the metric value of "Transfer (data transfer rate)," which is the metric for "PORT A," is "88 [MB/s]."

A threshold value setting unit 85 compares the current performance value of each resource for a path, stored in the pooling time record table 84 (FIG. 6), and the performance value of each resource for the path during past 'performance problem times,' stored in the 'performance problem time' record table 86 shown in FIG. 7, or the performance value of each resource for the path during past 'no performance problem times'. The threshold value setting unit 85, if the current performance value of each resource meets certain criteria, stores the current performance value of each resource in the 'performance problem time' record table 86 or a 'no performance problem time' record table 87, as a threshold value for the performance value of each resource during a 'performance problem time' or 'no performance problem occurrence time' for the path. The threshold value setting unit 85's above processing will be described in detail later using the flowchart shown in FIG. 16.

The 'performance problem time' record table 86 is a table for holding the performance values of the resources on each path during past 'performance problem times,' as threshold values for the respective resources, and as shown in FIG. 7, consists of a path ID column 86A, a resource column 86B, a performance unit column 86C, a performance problem occurrence time threshold value column 86D, and a record ID column 86E. The corresponding content stored in the path ID column 84A, the resource column 84B, the performance unit column 84C, or the performance value column 84D in the 'polling time' record table (FIG. 6) is copied to the path ID column 86A, the resource column 86B, the performance unit column 86C, or the performance problem occurrence time threshold value column 86D, respectively, as needed.

The record ID column 86E stores record IDs for the performance values of the corresponding resources stored in the same rows in the performance problem occurrence time threshold value column 86D. The same record ID is provided for the performance values of the resources on the same path acquired during the same polling. Accordingly, the FIG. 7 example shows that the information in the rows provided with record ID "001" includes the performance values of the resources on a path with path ID "A-1" acquired by the same polling during the occurrence of a performance problem, and that the performance value of each resource during that time is set as a lower limit threshold value of each resource to determine the possibility of the occurrence of a performance problem.

The 'no performance problem time' record table 87 is a table for holding the performance values of the resources during past 'no performance problem times,' as threshold values for the respective resources, and as shown in FIG. 8, consists of a path ID column 87A, a resource column 87B, a performance unit column 87C, a 'no performance problem time' threshold value column 87D and a record ID column 87E. The corresponding content stored in the path ID column 84A, the resource column 84B, the performance unit column 84C, or the performance value column 84D in the 'polling time' record table 84 (FIG. 6) is copied to the path ID column 87A, the resource column 87B, the performance unit column 87C, or the 'no performance problem time' threshold value column 87D, respectively, as needed.

The record ID column 87E stores record IDs for the performance values of the corresponding resources stored in the same rows of the 'no performance problem time' threshold value column 87D. The performance values of the resources on the same path acquired during the same polling are provided with the same record ID. Accordingly, the FIG. 8 example shows that information in the rows storing record ID "001" in the record ID column 87E is the performance values of the resources on the path with path ID "A-1" acquired by the same polling during a 'no performance problem time,' and that the performance value of each resource at this time is set as an upper limit threshold value of each resource to ensure that there is no possibility of a performance problem occurring.

For each path, a performance judgment unit 88 judges whether a performance problem may occur or not, based on information on the business applications and path-path relationships, and target performance values required by the business applications, obtained from the application performance value table 82 and the application performance value table 83, the current performance values of the resources on each path obtained from the 'polling time' record table 84, the performance values of the resources during past 'performance problem times' and during past 'no performance problem times' held in the 'performance problem time' record table 86 and the 'no performance problem time' record table 87. If there is a path that may cause a performance problem, the performance judgment unit 88 sends a relevant warning to the performance management client 7 via the user notification unit 89. The performance judgment unit 88's above processing will be detailed later using the flowchart shown in FIG. 19.

The performance management client 7, upon receipt of the warning, shows a warning window 90, for example, like that shown in FIG. 9, on a display. The warning window 90 includes a title portion 94, a transmission source e-mail address display portion 95, and a warning content display portion 86. The name of the business application whose performance may deteriorate is displayed in the title portion 94, and the e-mail address of the performance management server 6 is shown in the transmission source address display portion 95. The warning content display portion 96 displays information, such as the name of the business application that may cause performance deterioration, the target performance value set by a system administrator for the business application, the current performance value of the business application acquired by polling, and the time at which the performance value was obtained (polling time instant).

As a result, in the storage system 1, a system administrator can recognize a business application that may cause a performance problem, based on this warning window 90, and as a result it is possible to prevent a performance problem occurring, by action, such as switching the path used by this business application or the paths for the other business applications that share the path, to other paths.

FIGS. 10A, 10B, 11A, 11B, 12A, 12B, 13 and 14 each show an example and a table structure of the resource-resource relationship information storage table 76 in the aforementioned performance information collection agent 61 shown in FIG. 3.

FIGS. 10A and 10B show examples of information stored in the resource-resource relationship information storage table 76 the host performance information collection agent 32 in host server A shown in FIG. 2 uses. The resource-resource relationship information storage table 76 the host performance information collection agent 32 in host server A uses includes a file-volume relationship table 100 (FIG. 10A), and a volume-logical volume-port relationship table 101 (FIG. 10B).

FIGS. 11A and 11B show examples of information stored in the resource-resource relationship information record table 76 the host performance information collection agent 32 in host server B shown in FIG. 2 uses. The resource-resource relationship information storage table 76 the host performance information collection agent 32 in host server B uses includes a file-volume relationship table 102 (FIG. 11A), and a volume-logical volume-port relationship table 103 (FIG. 11B).

The resource-resource relationship information storage table 76 the database performance information collection agent 31 in host server B uses includes the database object-table area relationship table 103 shown in FIG. 12A, and the table area-file relationship table 104 shown in FIG. 12B.

The resource-resource relationship information storage table 76 used by the SAN switch performance information collection agent 50 (FIG. 1) uses information in port-to-port path table 105 shown in FIG. 13. The resource-resource relationship information storage table 76 the storage performance information collection agent 51 (FIG. 1) uses includes the logical volume-parity group relationship table 106 shown in FIG. 14. The content of each table in FIGS. 10 to 14 is shown as storing the values corresponding to the FIG. 2 example.

The file-volume relationship tables 100 and 102 (FIG. 10A and FIG. 11A) are for storing the dependence relationship in terms of performance between file resources and volume resources, and include file ID storing columns 100A and 102A (FIG. 10A and FIG. 11A), and volume ID storing columns 100B and 102B (FIG. 10A and FIG. 11A). Each row in the file-volume relationship tables 100 and 102 corresponds to one of the file-volume dependence relationships. The file ID storing columns 100A and 102A store file IDs, and the volume ID storing columns 100B and 102B store IDs for volumes having dependence relationships with files designated in the file ID storing columns 100A and 102A. For example, FIG. 10A shows the dependence relationship between file A and volume A as the content of the first row in the file-volume relationship table 100, and FIG. 11A shows the dependence relationship between file H and file D as the content of the first row in the file-volume relationship table 102.

The volume-logical volume-port relationship tables 101 and 103 (FIG. 10B and FIG. 11B) are for storing the dependence relationships between volumes and logical volumes, and the dependence relationships between the volumes and logical volumes, and the host bus adapter-side ports and storage side ports on the paths connecting the volumes and logical volumes; and include volume ID storing columns 101A and 103A (FIG. 10B and FIG. 11B), logical volume storing columns 101B and 103B (FIG. 10B and FIG. 11B), host-side port ID storing columns 101C and 103C (FIG. 10B and FIG. 11B), and storage-side port ID storing columns 101D and 103D (FIG. 10B and FIG. 11B).

The volume ID storing columns 101A and 103A store volume IDs, and the logical volume ID storing columns 101B and 103B store IDs for logical volumes having dependence relationships with the volumes designated in the volume ID storing columns 101A and 103A. The host-side port ID storing columns 101C and 103C store IDs for host bus adapter-side ports on the paths connecting the corresponding volumes and logical volumes, and the storage-side port ID storing columns 101D and 103D store IDs for storage-side ports on those same paths.

For example, FIG. 10B shows the dependence relationship between volume A, logical volume A, port A, and port N, as the content of the first row in the volume-logical volume-port relationship table 101, and FIG. 11B shows the dependence relationship between volume D, logical volume D, port B, and port P, as the content of the first row in the table 103.

Information showing a dependence relationship in terms performance may include information relating to resources on a path to access a storage apparatus from a computer, or their metric information, information relating to the storage apparatus 10, information on a table the database management software 23 (FIG. 23) manages or information on a file a file system manages, or information associating the above information with each other, and may also include any other similar information.

When storing information indicating a dependence relationship in a memory device, path information the storage system performance management software 54 (FIG. 1 or FIG. 3) holds, or information relating to storage apparatuses or computers may be displayed on the display using a client program (browser), etc., and instructions on the resource-resource or metric-metric dependence relationships input by a user to the client program may be received, and based on the instructions, information indicating the dependence relationships may be stored in the memory device. Also, a user may store, in advance, information indicating the dependence relationships in the resource-resource relationship information storage table 76, or may also use any other method.

The database object-table area relationship table 104 in host server B includes a database object ID storing column 104A and a table area ID storing column 104B. The table area-file relationship table 105 in host server B in FIG. 12B includes a table area ID storing column 105A and a file ID storing column 105B. The content of the database object ID storing column 104A and the table area ID storing column 104B in the database object-table area relationship table 104 is the same as that of the corresponding table area ID storing column 105A and the file ID storing column 105B in the table area-file relationship table 105 in host server B. The FIG. 12 example shows that the first row of the database object-table area relationship table 104 in host server B indicates the dependence relationship between table D and table area D, and the first row of the table area-file relationship table 105 indicates the relationship between table area D and file H.

The port-to-port path table 106 shown in FIG. 13 is for storing the dependence relationships between the host bus adapter-side ports and the storage-side ports, and the ports for SAN switches 9 (FIG. 1) on the paths between these ports. The port-to-port path table 106 includes a host-side port ID storing column 106A, a storage-side port ID storing column 106B, and a switch port ID list storing column 106C.

The host-side port ID storing column 106A stores IDs for ports for host bus adapters, and the storage-side port ID storing column 106B stores IDs for ports 28 (FIG. 1) for the storage apparatus 10. The switch port ID list storing column 106C stores series of IDs for ports for the SAN switches 9 on the paths connecting the ports in the column 106A and the ports in the column 106B. The FIG. 13 example shows the dependence relationship between port A and port N in the first row of the port-to-port path table 106, and the port series between these ports {port C, port D, port H, port I}.

The logical volume-parity group relationship table shown in FIG. 14 is for storing the dependence relationships between logical volume resources and parity group resources. The logical volume-parity group relationship table 107 includes a logical volume ID storing column 107A and a parity group ID storing column 107B. Each row in the logical volume-parity group relationship table 107 corresponds to one of the dependence relationships between the volumes and the parity groups. The logical volume ID storing column 107A stores IDs for logical volumes, and the parity group ID storing table 107B stores IDs for parity groups having dependence relationships with the logical volumes designated by the logical volume ID storing column 107A. The FIG. 14 example shows the dependence relationship between logical volume A and parity group A in the first row of the logical volume-parity group relationship table 107.

Figure 15:
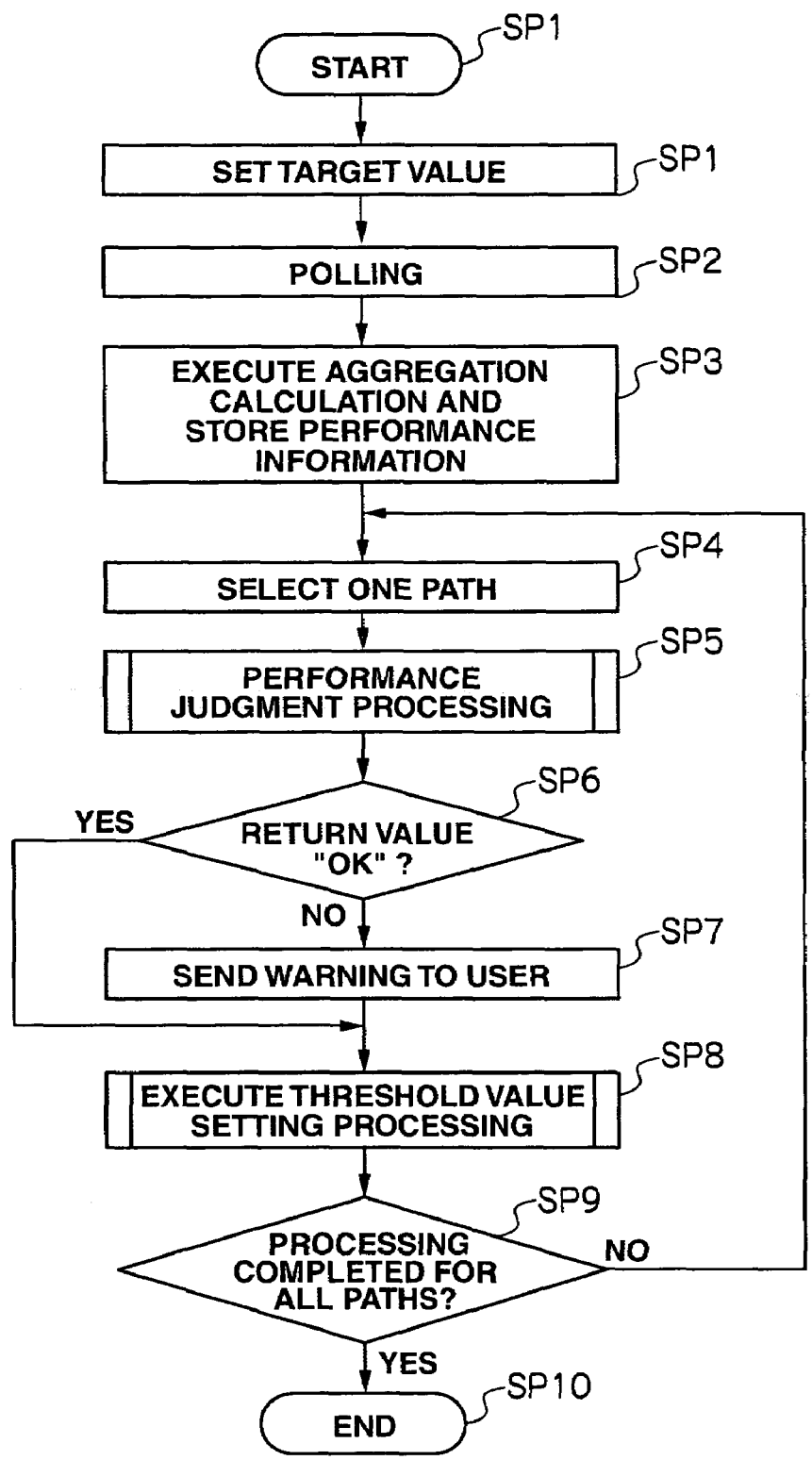
FIG. 15 is a flowchart showing a series of processes relating to performance monitoring and warning function in a storage system.

(2-3) Flow of Processing Relating to Performance Monitoring and Warning Function FIG. 15 shows the flow of a series of processes for the performance monitoring and warning function in the storage system 1. When executing the performance monitoring and warning function, a system administrator sets the target value of the response time/throughput for each business application using the performance management server 6 (SP1).

Once the target values have been set, the performance information collection unit 80 (FIG. 3) in the storage system performance management software 54 (FIG. 3) in the performance management server 6 collects performance information on the resources collected by the business software information collection agent 30, the database performance information collection agent 31, and the host performance information collection agent 32 in each host server 3, and the SAN switch performance information collection agent 50 in the performance information collection server 4, and the storage performance information collection agent 51 in the performance information collection server 5 (SP2).

Then, the relationship information generation unit 81 (FIG. 3) in the storage system performance management software 54 executes a relevant aggregation calculation based on the performance values of the resources collected by the monitoring information collection unit 80.

The "aggregation calculation" includes "aggregation calculation in the resource axis direction," and "aggregation calculation in the time axis direction." The "aggregation calculation in the resource axis direction" is a calculation performed on a plurality of resources (adding or averaging, etc.) treated as one piece of performance information. An example of the calculation is that an average value of the number of I/Os per unit of time for port Q4 to port Q7, port F and port G in FIG. 2 is considered the number of I/Os per unit of time for SAN switch B. The "aggregation calculation in the time axis direction" is a calculation that treats the values in a certain unit of time like time, date, month or year as one piece of performance information for calculation (adding or averaging, etc.). For example, a value obtained by adding a 24-hour amount of hourly data for SAN switch B in FIG. 2 and averaging the added amount of data is considered as data for "one day."

The relationship information creation unit 81, when performing the relevant aggregation calculation, stores performance information on each resource acquired in the polling at step SP2, and performance information on each resource obtained by the aggregation calculation at step SP3, in the respective corresponding path-application relationship table 82 (FIG. 4), the application performance value table 83 (FIG. 5), or the 'polling time' record table 84 (FIG. 6) (SP3).

Subsequently, the performance judgment unit 88 (FIG. 3) in the storage system performance management software 54 selects one of the paths used by any of the business applications having any of the business applications 2 installed (SP4). Then, the performance judgment unit 88 judges the performance of each resource on this path (SP5), and judges whether or not a conclusion that there is no possibility of occurrence of a performance problem (i.e., the return value in the processing at step SP5 is the "OK" described later) has been obtained (SP6).

If a conclusion that there is no possibility of occurrence of a performance problem has been obtained in this judgment processing (hereinafter referred to as "performance judgment processing"), the performance judgment unit 88 activates the threshold value setting unit (FIG. 3) and executes the later-described threshold value setting processing (SP8).

Meanwhile, if a conclusion that a performance problem has already occurred in the path (i.e., the return value in the processing at step SP 5 is "0") or there is a high possibility of a performance problem occurring in the path (the return value in the processing at step SP5 is "1"), or there is a possibility that a performance problem occurs in the path (the return value in the processing at step SP5 is "2") has been obtained in the performance judgment processing, the performance judgment unit 88 sends a warning according to the judgment result to the performance management client 7 via the user notification unit 89 (SP7). Subsequently, the performance judgment unit 88 activates the threshold value setting unit 85 (FIG. 3) and executes the later-described threshold value setting processing (SP8).

Subsequently, the performance judgment unit 88 judges whether or not the same performance judgment processing and threshold value setting processing have been performed for all the paths used by the business applications installed in each business client 2 (SP9), and upon a negative result, returns to step SP4, and repeats the same processing (SP4 to SP9). Then, the performance judgment unit 88, when the same performance judgment processing and threshold value processing have been completed for all the paths, terminates the processing relating to performance monitoring and warning function (SP10).

Figure 16:
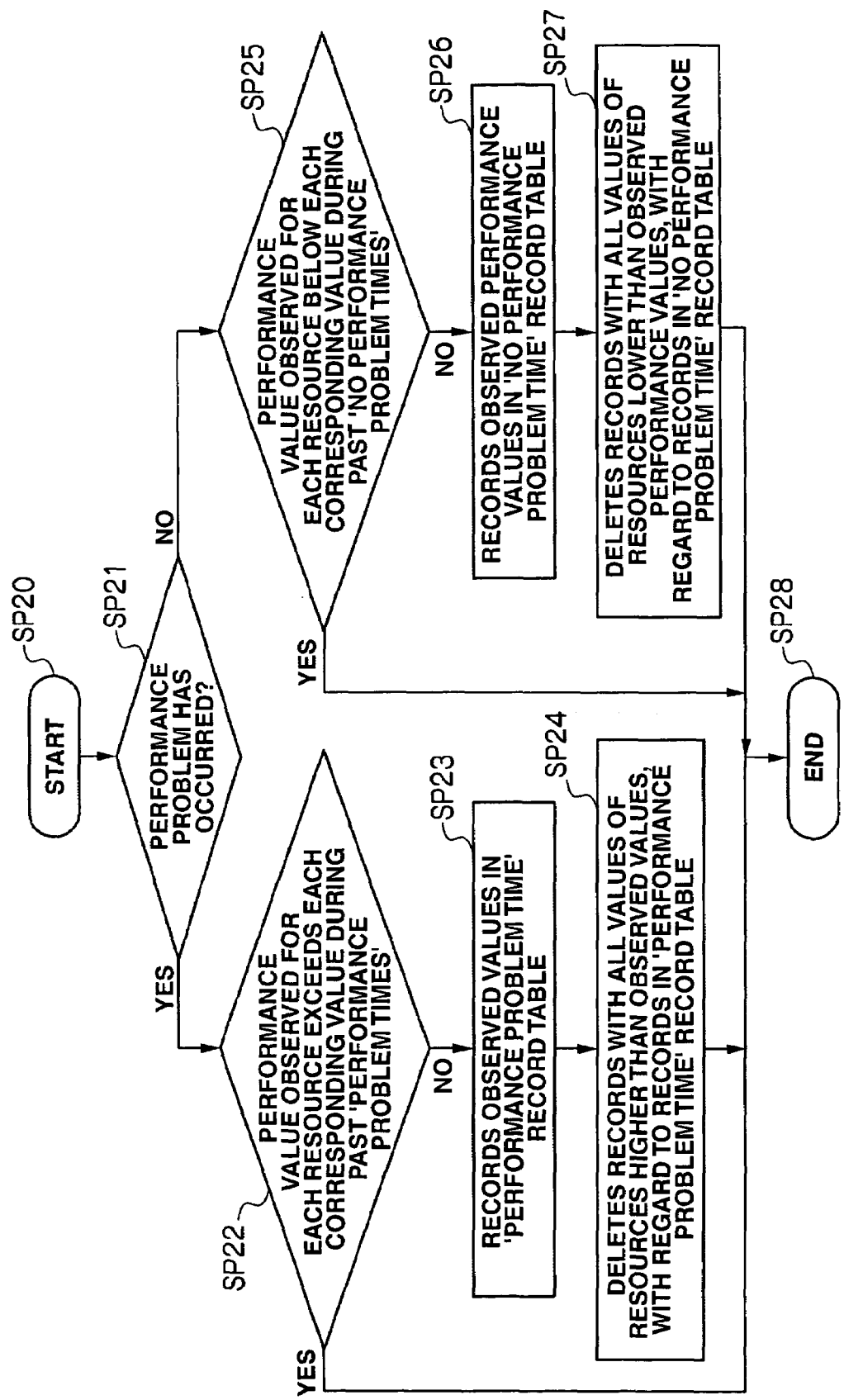
FIG. 16 is a flowchart showing the content of processing performed by a threshold value setting unit in relation to threshold value setting processing.

FIG. 16 is a flowchart showing the content of processing performed by the threshold value setting unit 85 (FIG. 3) in the storage system performance management software 54 in the performance management server 6 in relation to threshold value setting processing (step SP8 in the flowchart shown in FIG. 15) in the performance monitoring and warning function.

When starting the threshold value setting processing shown in FIG. 16 at step SP8 in the flowchart in FIG. 15 (SP20), the threshold value setting unit 85, first, referring to the application performance value table 83 (FIG. 5), judges whether any performance problem has occurred in the current target path (SP21). More specifically, it judges whether or not the current performance value of a business application that uses the path is smaller than the target performance value set in advance for the business application.

Upon an affirmative result in this judgment, the threshold value setting unit 85, referring to the 'polling time' record table 84 (FIG. 6) and the 'performance problem time' record table 86 (FIG. 7), judges whether or not the current performance value of each resource exceeds the performance value of each resource during past 'performance problem times' registered in the 'performance problem time' record table 86 (SP22).

Figure 17:
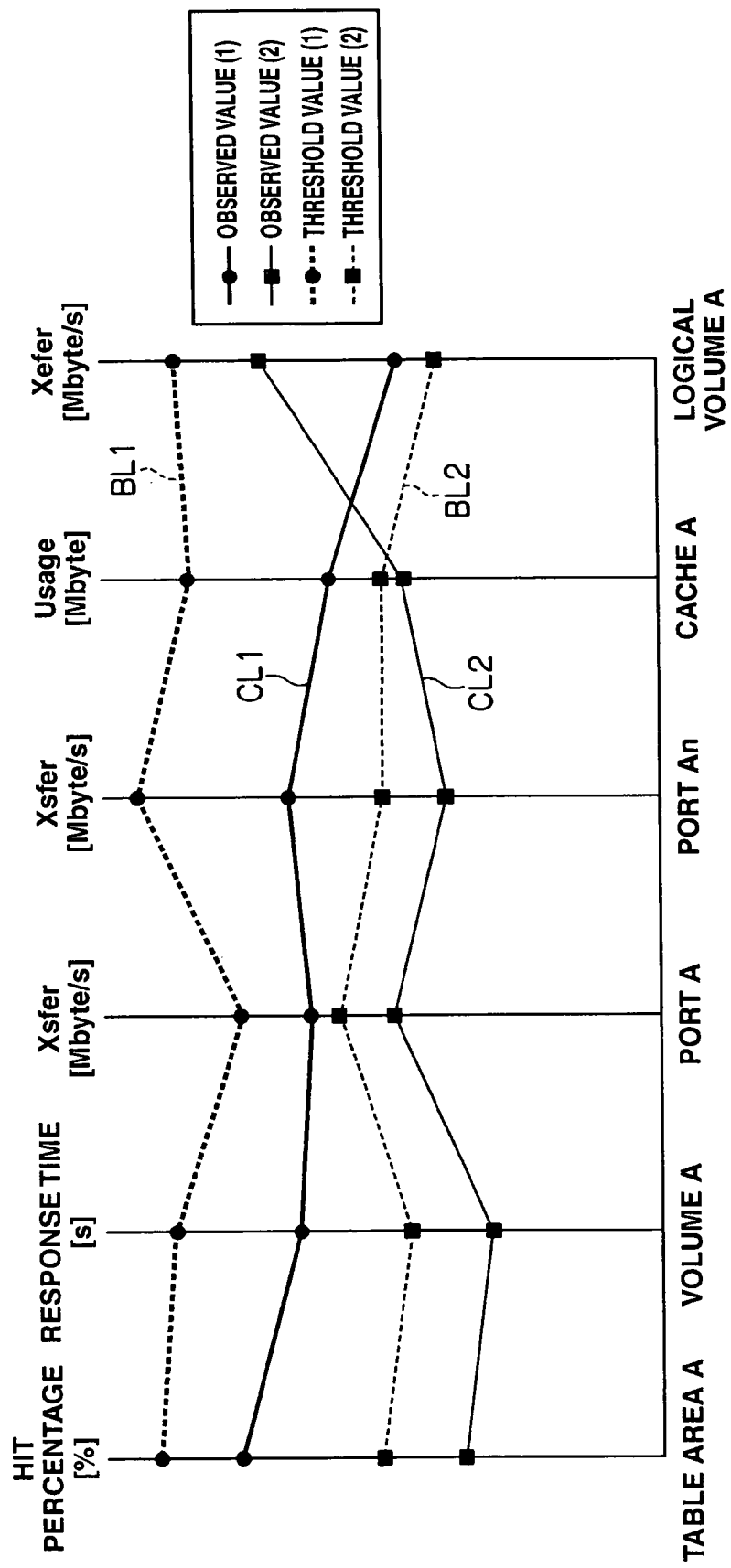
FIG. 17 is a conceptual diagram provided for explaining the content of processing performed by a threshold setting unit in relation to threshold value setting processing.

In this case, for example, as shown in FIG. 17, when performance information with the performance values of the resources exhibiting the values denoted by "●" on broken line BL1 is registered in the 'performance problem time' record table 86, and if the current performance values of the resources are the values denoted by "●" on complete line CL1 or the values denoted by "■" on complete line CL2, a negative result will be obtained in the judgment at step SP22. This means that all the resources currently have loads higher than those during all the past 'performance problem times' registered in the 'performance problem time' record table 86. Accordingly, at this time, the threshold value setting unit 85 terminates the threshold value setting processing without updating the 'performance problem time' record table 86 (SP28).

Meanwhile, in FIG. 17, when performance information with the performance values of the resources exhibiting the values denoted by "■" on broken line BL2 is registered in the 'performance problem time' record table 86, and if the current values of each resource are values denoted by "■" on complete line CL1, an affirmative result will be obtained in the judgment at step SP22. This means that at least one resource has a performance problem, although it has loads lower than those during any past 'performance problem time' registered in the 'performance problem time' record table 86.

At this time, the threshold setting unit 85 registers the current performance values of the resources registered in the 'polling time' record table 84 (FIG. 6), in the 'performance problem time' record table 86 with record IDs added to these values (SP23). The threshold value setting unit 85 then searches for performance information with all the performance values of the resources higher than the current performance values of the resources from among the performance information during some past 'performance problem times' registered in the 'performance problem time' record table 86, and if any such information exists, deletes that record (SP24). The threshold setting unit 85 then terminates the threshold value setting processing (SP28).

The above processing makes it possible to set the performance values of the resources when any of the resources has a relatively-low load but a performance problem has occurred, as threshold values for the judgment that a performance problem will occur in the later-described judgment processing.

Meanwhile the threshold value setting unit 85, upon a negative result at step SP21, referring to the 'polling time' record table 84 (FIG. 6) and the 'no performance problem time' record table 87 (FIG. 8), judges whether all the current performance values of the resources are below the performance values of the respective corresponding resources during any past 'no performance problem time' registered in the 'no performance problem time' record table 87 (SP25).

Figure 18:
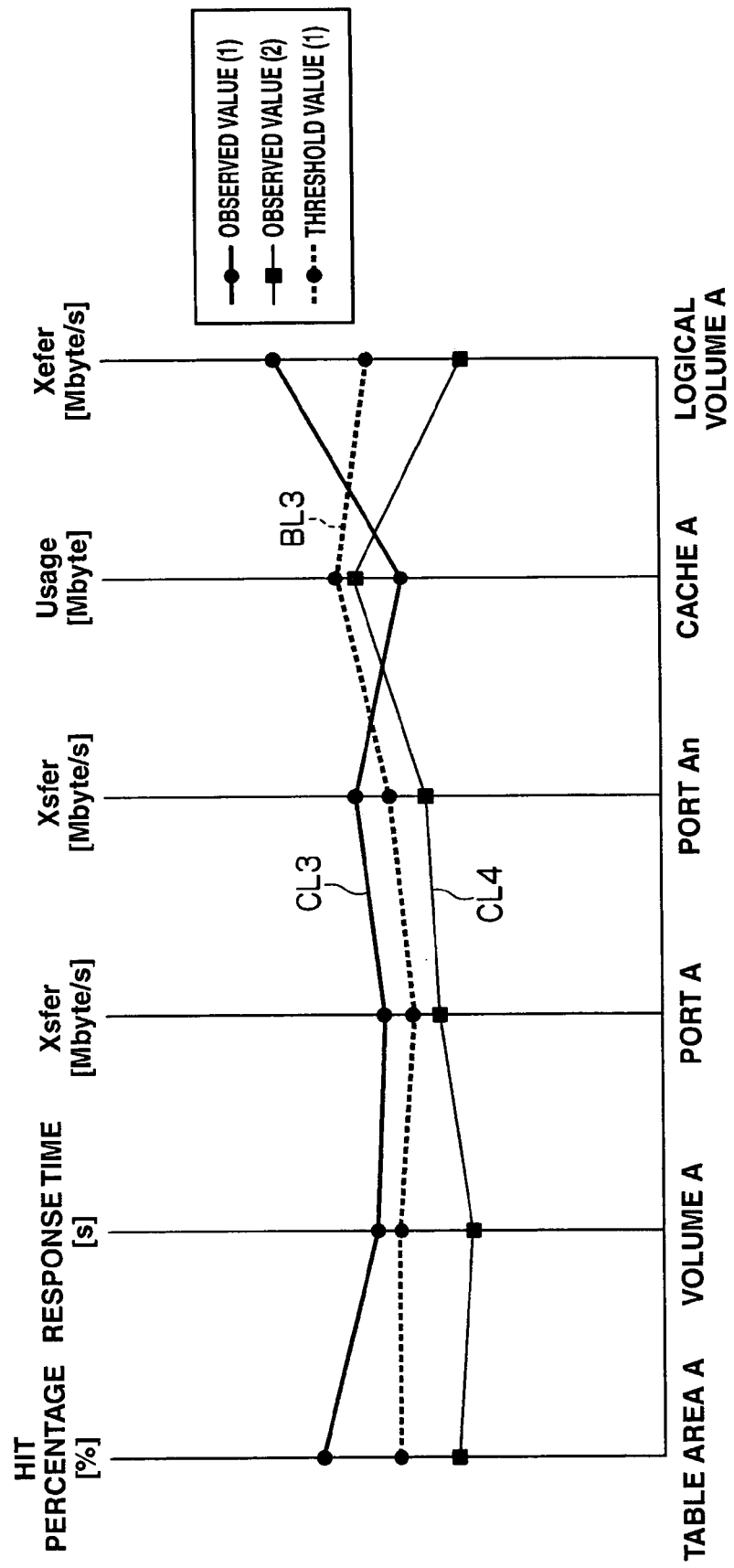
FIG. 18 is a conceptual diagram provided for explaining the content of processing performed by a threshold setting unit in relation to threshold value setting processing.

In this case, for example, as shown in FIG. 18, when performance information with the performance values of the resources exhibiting the values denoted by "●" on broken line BL3 is registered in the 'no performance problem time' record table 87, and if the current performance values of the resources are values denoted by "■" on complete line CL4, an affirmative result will be obtained at this step SP25. This means that all the resources on the path have loads lower than those during all the 'no performance problem times' registered in the 'no performance problem time' record table 87. The threshold value setting unit 85 then terminates this threshold value setting processing without updating the 'no performance problem time' record table 87 (SP28).

Meanwhile, in FIG. 18, when performance information with the performance values of the resources exhibiting the values denoted by "●" on broken line BL1 is registered in the 'no performance problem time' record table 87, and if the current values of the resources are the values denoted by "●" on complete line CL3, a negative result will be obtained at step SP25. This means that no performance problem has occurred, although at least one resource has loads higher than those during any past 'performance problem time' registered in the 'no performance problem time' record table 87.

At this time, the threshold value setting unit 85 copies the current performance values of the resources registered in the 'polling time' record table 84 (FIG. 6) to the 'no performance problem time' record table 87 (SP26). The threshold value setting unit 85 then searches for performance information with all the performance values of the resources being lower than the current performance values of the resources from among the performance information during some past 'no performance problem times' registered in the 'no performance problem time' record table 87, and if any such performance information exists, deletes the record (SP27). The threshold value setting unit 85 then terminates the threshold value setting processing (SP28).

The above processing makes it possible to set the performance values of resources when any of the resources has a relatively-high load but no performance problem has occurred as threshold values for the judgment that no performance problem will occur in the later-described performance judgment processing.

Figure 19:
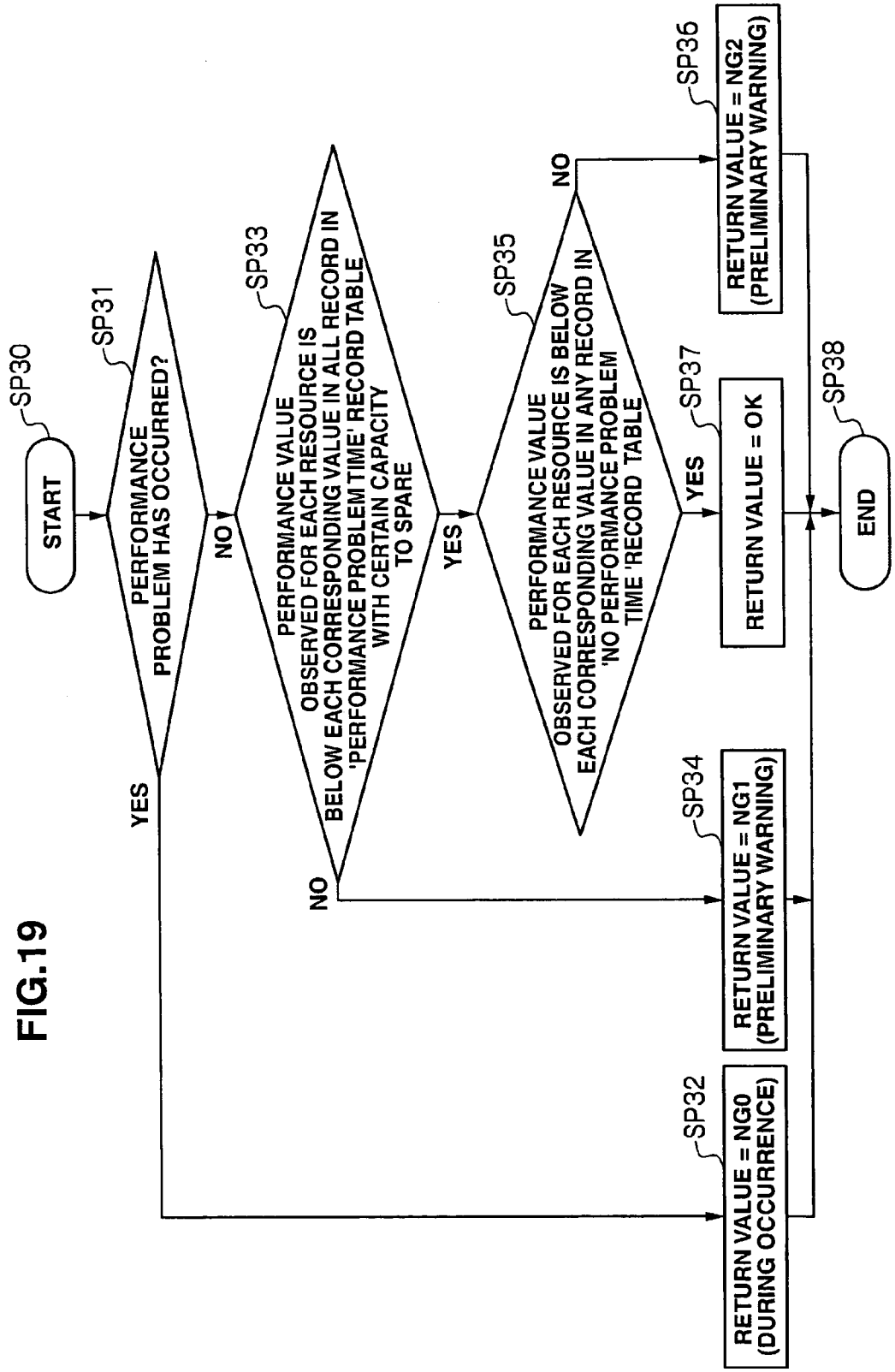
FIG. 19 is a flowchart showing the content of processing performed by a performance judgment unit in relation to performance judgment processing.

FIG. 19 is a flowchart indicating the content of the processing performed by the performance judgment unit 88 (FIG. 3) in the performance management server 6's storage system management software 54 in relation to the performance judgment processing (step SP5 in the flowchart shown in FIG. 15) in the performance monitoring and warning function.

Upon start of the performance judgment processing shown in FIG. 19 at step SP5 in the flowchart in FIG. 15 (SP30), the performance judgment unit 88, first, referring to the application performance value table 83 (FIG. 5), judges whether or not any performance problem has occurred in the current target path (SP31). More specifically, it judges whether or not the current performance value of a business application using that path is smaller than the target performance value set in advance for that business application.

The performance judgment unit 85, upon an affirmative result in this judgment, sets the return value to "NG0" (SP32), and then terminates this performance judgment processing (SP38).

Meanwhile, upon a negative result in this judgment, the performance judgment unit 85, referring to the 'polling time' record table (FIG. 6) and the no 'performance problem time' record table 86 (FIG. 7), judges whether or not all the current performance values of the resources are below the corresponding performance values of the resources during all the past 'performance problem times' registered in the 'performance problem time' record table 86, each with a determined capacity to spare (SP33). This capacity to spare is one in which, taking the values during past 'performance problem times' as a basis, if the performance value of any of the resources is larger than these values, there is a high possibility that a performance problem may occur. It has a size determined by a system administrator in advance.

Figure 20:
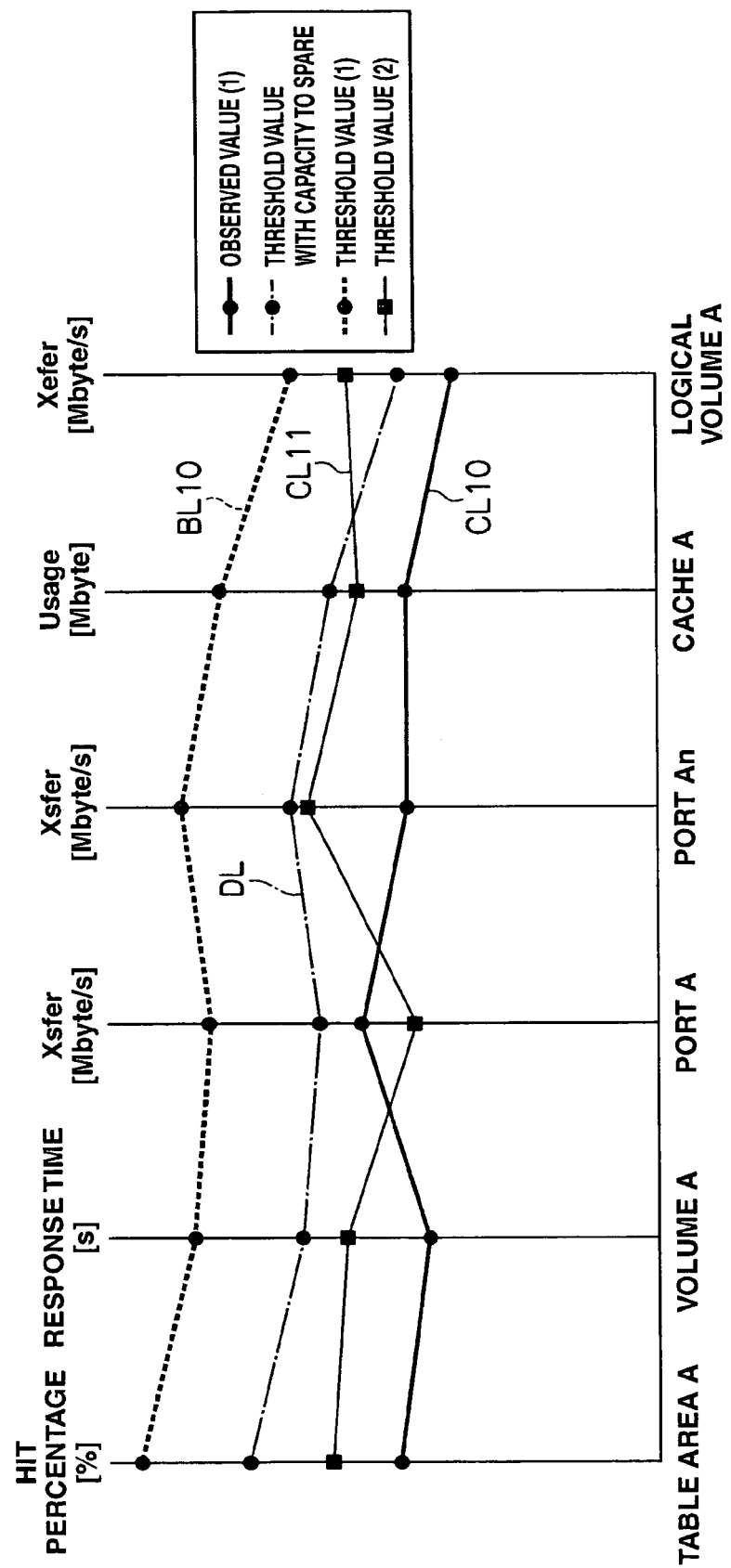
FIG. 20 is a conceptual diagram provided for explaining the content of processing performed by a performance judgment unit in relation to performance judgment processing.

In this case, as shown in FIG. 20, when only performance information with the performance values of the resources being the values denoted by "●" on broken line BL10 is registered in the 'performance problem time' record table 86, and the performance values of the resources after the provision of the capacity to spare are the values denoted by "●" on dashed line DL, and if the current performance values of the resources are the values denoted by "■" on complete line CL11, a negative result will be obtained in the judgment at step SP33. This means that at least one resource does not have loads low enough to have a certain capacity to spare, even compared to the performance status during the past 'performance problem times' registered in the 'performance problem time' record table 86. Accordingly, the performance judgment unit 85 sets the return value to "NG1" (SP34), and then terminates the performance judgment processing (SP38).

Meanwhile, in FIG. 20, if the current performance values of the resources are the values denoted by "●" on broken line BL10, an affirmative result will be obtained in the judgment at step SP33. This means that all the resources on the current target path have loads low enough to have a certain capacity to spare, compared to the performance status during past 'performance problem times' registered in the 'performance problem time' record table 86. Accordingly, the performance judgment unit 85 judges whether or not all the current performance values of the resources are below the corresponding performance values of the resources during all the past 'no performance problem times' registered in the 'no performance problem time' record table 87 (FIG. 8) (SP35).

Figure 21:
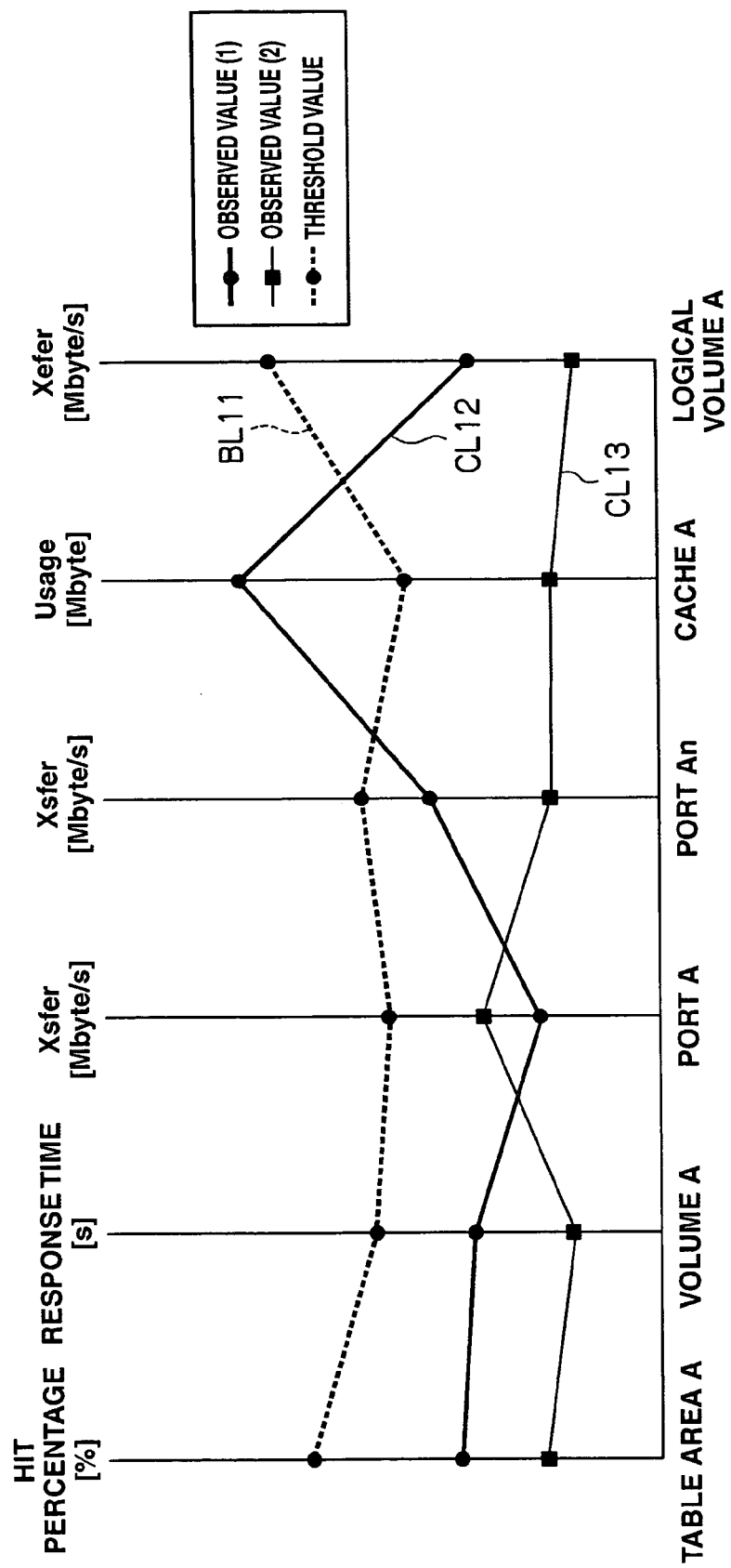
FIG. 21 is a conceptual diagram provided for explaining the content of processing performed by a performance judgment unit in relation to performance judgment processing.

In this case, as shown in FIG. 21, for example, when performance information with the performance values of the resources being the values denoted by "●" on broken line BL1 is registered in the 'no performance problem time' record table 87, and if the current values of the resources are values denoted by "●" on complete line CL12, a negative result will be obtained in the judgment at step SP35. This means that at least one resource on the current target path has loads higher than those during any past 'no performance problem time' registered in the 'no performance problem time' record table 87. Accordingly, the performance judgment unit 85 sets the return value to "NG2" (SP36), and then terminates the performance judgment processing (SP38).

Meanwhile, in FIG. 21, if the current values of the resources are values denoted by "■" on complete line CL13, an affirmative result will be obtained in the judgment at step SP35. This means that all the resources on the current target path have loads lower than those during all the past 'no performance problem times' registered in the 'no performance problem time' record table 87. Accordingly, the performance judgment unit 85 sets the return value to "OK" (SP37), and terminates the performance judgment processing (SP38).

(2-4) Observation Result Display Function

Figure 22:
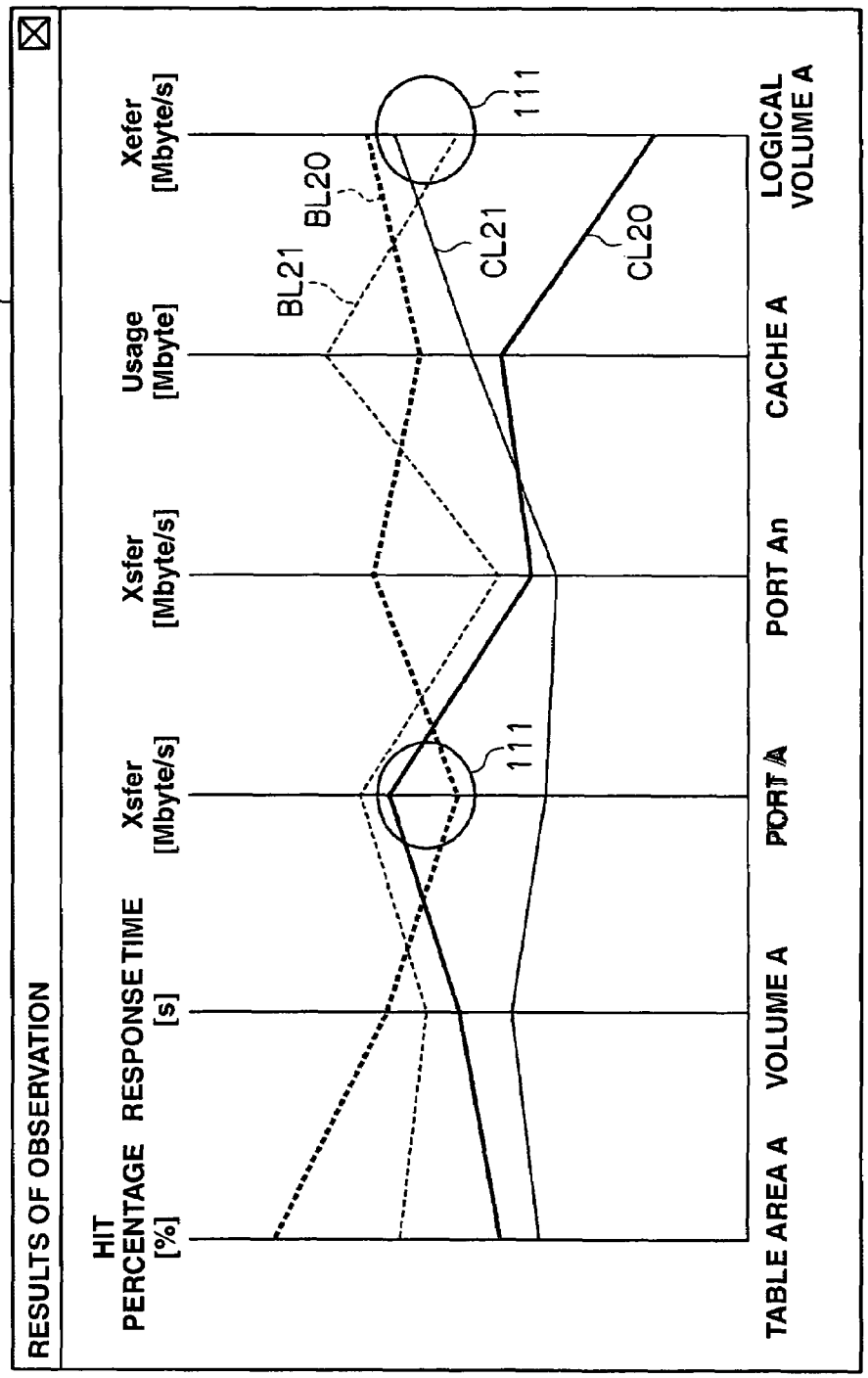
FIG. 22 is a diagram showing an example of an observation result display window.

In this storage system 1, when the aforementioned warning is given from the performance management server 6 to the performance management client 7 according to the processing at step SP7 in the flowchart in FIG. 15, a system administrator can display, via the performance management client 7, an observation result display window 110, such as shown in FIG. 22, on the performance management client 7's display.

In this observation result display window 110, the performance values of the resources during the past 'performance problem times' registered in the 'performance problem time' record table 86 (FIG. 7), the performance values of the resources during the past 'no performance problem times' registered in the 'no performance problem time' record table 87 (FIG. 8), and the current performance values of the resources on the target path are displayed in a line graph in which the values can be compared to each other. In the FIG. 22 example, the vertical axis represents the performance value, and the horizontal axis represents the resources with a certain space in the order of existence on the path. Broken line BL20 shows the values during a 'performance problem time,' broken line BL21 shows the values during a 'no performance problem time,' and complete lines CL20 and CL21 each show an example of the current values of the resources.

The observation result display window 110 displays a mark 111 on the line graph showing the current performance values of the resources (complete line CL20 or complete lime CL21) to circle the part that may cause a performance problem. This makes it possible for a system administrator to visibly recognize a resource that may be a bottleneck.

(3) Effect of the Present Embodiment

As described above, in the storage system according to the present embodiment, the existence or non-existence of a performance problem will be determined using the performance values of the resources during past 'performance problem times' and those during past 'no performance problem times', and the current performance values of the resources. Accordingly, the threshold values for the performance values of the resources can be set comprehensively taking into account the mutually-complementary dependence relationships in terms of performance between the resources, resulting in a highly-reliable storage system.

(4) Other Embodiments

The above-described embodiment relates to the case where memory 53 is used as a memory device that stores the performance values of the resources during past 'performance problem times' and those during past 'no performance problem times' in the performance management server 6. However, the present invention is not limited to the above case, and other memory devices, such as disk recording media like hard disks, may be used.

The above-described embodiment relates to the case where the performance management server 6 stores, as threshold values, the performance values of the resources during past 'performance problem times' and those during 'no performance problem times.' However, the present invention is not limited to the above case. It is possible that at least either one of the performance values during past 'performance problem times' and those during past 'no performance problem times' is stored as a threshold value, and that the threshold values for the resources are set based solely on whichever of those values is stored.

The above embodiment relates to the case where when the current performance value of a business application using a path is smaller than the target performance value set in advance for that business application, the path is judged as having a performance problem. However, the present invention is not limited to the above case, and it is possible that, for example, a performance problem will be judged as not having occurred, so long as the current performance value of a business application is smaller than the target performance value only to the extent of several percent; and other criteria may also be adopted for judging the occurrence or non-occurrence of performance problems.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A storage system having a higher level system with a predetermined application installed, a storage apparatus providing a storage area the application uses, and a host server that transmits data between the higher level system and the storage apparatus; the storage system comprising:

a performance information collection unit that collects a current performance value for each of performance information collection targets existing on a data path between the higher level system and the storage apparatus;

a memory unit that stores past performance values of performance information collection targets of different data paths between the higher level system and the storage apparatus during past performance-problem-times;

a performance judgment unit that judges whether or not a performance problem has occurred, based on a target performance value set in advance for the application and a current performance value for the application; and a threshold setting unit that automatically sets threshold values for the performance values of the performance information collection targets, based on the current performance values of the performance information collection targets collected by the performance information collection unit and judging results of the performance judgment unit, wherein when a performance problem is judged by the performance judgment unit as having occurred, and if all the current performance values of the performance information collection targets do not exceed the corresponding performance values of the performance information collection targets during the past performance-problem-times stored in the memory unit, the threshold value setting unit stores the current performance values of the performance information collection targets into the memory unit thereby automatically setting said threshold values for the performance values of the performance information collection targets when one of which has a relatively-low load and deletes from the memory unit any record with all the performance values of the performance information collection targets higher than the corresponding current performance values of the performance information collection targets from among records relating to the performance values of the performance information collection targets during the past performance-problem-times stored in the memory unit.

2. The storage system according to claim 1, wherein the memory unit further stores past performance values of performance information collection targets of different data paths between the higher level system and the storage apparatus during past no-performance-problem-times, and wherein when a performance problem is judged by the performance judgment unit as did not occur, and if all the current performance values of the performance information collection targets are equal to or exceed the corresponding performance values of the performance information collection targets during the past no-performance-problem-times stored in the memory unit, the threshold value setting unit stores the current performance values of the performance information collection targets into the memory unit thereby automatically setting said threshold values for the performance values of the performance information collection targets when one of which has a relatively-high load, and deletes from the memory unit any record with all the performance values of the performance information collection targets lower than the corresponding current performance values of the performance information collection targets from among records relating to the performance values of the performance information collection targets during the past no-performance-problem-times stored in the memory unit.

3. The storage system according to claim 1, wherein if the current performance value of each performance information collection target collected by the performance information collection unit satisfies a predetermined criterion, the threshold value setting unit sets the current performance value of each performance information collection target as a threshold value for the performance value of each performance information collection target.

4. The storage system according to claim 1, wherein the performance judgment unit judges the performance status of the data path based on the threshold value for the performance value of each performance information collection target set by the threshold value setting unit and the current performance value of each performance information collection target collected by the performance information collection unit, and based on the result of the judgment, outputs a warning relating to the performance status of the data path as needed.

5. The storage system according to claim 4, wherein if all the current performance values of the one or more performance information collection targets collected by the performance information collection unit are not below the threshold values for the corresponding performance values of the one or more performance information collection targets set by the threshold value setting unit, each with a predetermined capacity to spare, the performance judgment unit outputs the warning relating to the current status of the data path.

6. The storage system according to claim 1, further comprising:
   a display unit that displays the current performance value of the application collected by the performance information collection unit and the performance value of each performance information collection target during the one or more past performance-problem-times and/or the one or more no-performance-problem-times stored in the memory unit so that they can be compared.

7. A management apparatus having a higher level apparatus with a predetermined application installed, a storage apparatus providing a storage area the application uses, and a host server that transmits data between the higher level apparatus and the storage apparatus; the management apparatus comprising:
   a performance information collection unit that collects a current performance value for each of performance information collection targets existing on a data path between the host server and the storage apparatus;
   a memory unit that stores past performance values of performance information collection targets of different data paths between the host server and the storage apparatus during past performance-problem-times;
   a performance judgment unit that judges whether or not a performance problem has occurred, based on a target performance value set in advance for the application and a current performance value for the application; and
   a threshold setting unit that automatically sets threshold values for the performance values of the performance information collection targets, based on the current performance values of the performance information collection targets collected by the performance information collection unit and judging results of the performance judgment unit,
   wherein when a performance problem is judged by the performance judgment unit as having occurred, and if all the current performance values of the performance information collection targets do not exceed the corresponding performance values of the performance information collection targets during the past performance-problem-times stored in the memory unit, the threshold value setting unit stores the current performance values of the performance information collection targets into the memory unit thereby automatically setting said threshold values for the performance values of the performance information collection targets when one of which has a relatively-low load, and deletes from the memory unit any record with all the performance values of the performance information collection targets higher than the corresponding current performance values of the performance information collection targets from among records relating to the performance values of the performance information collection targets during the past performance-problem-times stored in the memory unit.

8. The management apparatus according to claim 7,
   wherein the memory unit further stores past performance values of performance information collection targets of different data paths between the higher level system and the storage apparatus during past no-performance-problem-times, and
   wherein when a performance problem is judged by the performance judgment unit as did not occur, and if all the current performance values of the performance information collection targets are equal to or exceed the corresponding performance values of the performance information collection targets during the past no-performance-problem-times stored in the memory unit, the threshold value setting unit stores the current performance values of the performance information collection targets into the memory unit thereby automatically setting said threshold values for the performance values of the performance information collection targets when one of which has a relatively-high load, and deletes from the memory unit any record with all the performance values of the performance information collection targets lower than the corresponding current performance values of the performance information collection targets from among records relating to the performance values of the performance information collection targets during the past no-performance-problem-times stored in the memory unit.

9. The management apparatus according to claim 7, wherein if the current performance value of each performance information collection target collected by the performance information collection unit satisfies a predetermined criterion, the threshold value setting unit sets the current performance value of each performance information collection target as a threshold value for the performance value of each performance information collection target.

10. The management apparatus according to claim 7, wherein the performance judgment unit judges the performance status of the data path based on the threshold value for each performance information collection target set by the threshold value setting unit and the current performance value of each performance information collection target collected by the performance information collection unit, and based on the result of the judgment, outputs a warning relating to the performance status of the data path as needed.

11. The management apparatus according to claim 10, wherein if all the current performance values of the one or more performance information collection targets collected by the performance information collection unit are not below the threshold values for the corresponding performance values of the one or more performance information collection targets set by the threshold value setting unit, each with a predetermined capacity to spare, the performance judgment unit outputs the warning relating to the current status of the data path.

12. A management method for a storage system having a higher level system with a predetermined application installed, a storage apparatus providing a storage area the application uses, and a host server that transmits data between the higher level system and the storage apparatus; the method comprising:
   a first step of collecting a current performance value for each of performance information collection targets existing on a data path between the host server and the storage apparatus;

a second step of storing past performance values of performance information collection targets of different data paths between the host server and the storage apparatus during past performance-problem-times;

a third step of judging whether or not a performance problem has occurred, based on a target performance value set in advance for the application and a current performance value for the application; and a fourth step of setting threshold values for the performance values of the performance problem collection targets, based on the current performance values of the performance information collection targets and the result of the judgment of whether or not a performance problem has occurred, wherein the fourth step includes, when a performance problem is judged at the third step as having occurred, and if all the current performance values of the performance information collection targets do not exceed the stored corresponding performance values of the performance information collection targets during the past performance-problem-times, storing the current performance values of the performance information collection targets thereby automatically setting said threshold values for the performance values of the performance information collection targets when one of which has a relatively-low load, and deleting any record with all the performance values of the performance information collection targets higher than the corresponding current performance values of the performance information collection targets from among records relating to the stored performance values of the performance information collection targets during the past performance-problem-times.

13. The management method according to claim 12, wherein the second step includes storing past performance values of performance information collection targets of different data paths between the higher level system and the storage apparatus during past no-performance-problem-times, and the fourth step includes, when a performance problem is judged by the performance judgment unit as did not occur, and if all the current performance values of the performance information collection targets are equal to or exceed the corresponding performance values of the performance information collection targets during the past no-performance-problem-times as stored, storing the current performance values of the performance information collection targets thereby automatically setting said threshold values for the performance values of the performance information collection targets when one of which has a relatively-high load, and deleting any record with all the performance values of the performance information collection targets lower than the corresponding current performance values of the performance information collection targets from among records relating to the performance values of the performance information collection targets during the past no-performance-problem-times.

14. The management method according to claim 13, wherein the third step includes setting, if the current performance value of each performance information collection target satisfies a predetermined criterion, the current performance value of each performance information collection target as a threshold value for the performance value of each performance information collection target.

15. The management method according to claim 12, further comprising steps of judging the performance status of the data path based on the set threshold value for each performance information collection target and the current performance value of each performance information collection target, and based on the result of the judgment, outputting a warning relating to the performance status of the data path as needed.

16. The management method according to claim 15, wherein the fourth step includes outputting, if all the current performance values of the one or more performance information collection targets are not below the threshold values for the corresponding performance values of the one or more performance information collection targets, each with a predetermined capacity to spare, the warning relating to the current status of the data path.

* * * * *